United States Patent
Mulherkar

(10) Patent No.: US 10,365,887 B1
(45) Date of Patent: Jul. 30, 2019

(54) GENERATING COMMANDS BASED ON LOCATION AND WAKEWORD

(71) Applicant: Amazon Technologies, Inc., Seattle, WA (US)

(72) Inventor: Mandar Mulherkar, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 579 days.

(21) Appl. No.: 15/080,880

(22) Filed: Mar. 25, 2016

(51) Int. Cl.
*G10L 21/00* (2013.01)
*G06F 3/16* (2006.01)
*G10L 15/26* (2006.01)
*G10L 15/22* (2006.01)
*G10L 15/08* (2006.01)

(52) U.S. Cl.
CPC ............ *G06F 3/167* (2013.01); *G10L 15/265* (2013.01); *G10L 2015/088* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| 8,214,219 B2* | 7/2012 | Prieto | B60N 2/002 |
| | | | 381/58 |
| 8,965,697 B2* | 2/2015 | Sumiyoshi | G01C 21/3664 |
| | | | 701/539 |
| 9,286,889 B2* | 3/2016 | Kanevsky | G10L 15/08 |
| 9,293,133 B2* | 3/2016 | Kanevsky | G10L 15/08 |
| 9,293,134 B1* | 3/2016 | Saleem | G10L 13/00 |
| 2014/0365215 A1* | 12/2014 | Kim | G10L 15/22 |
| | | | 704/235 |
| 2015/0228281 A1* | 8/2015 | Raniere | G06F 3/167 |
| | | | 704/275 |
| 2016/0273931 A1* | 9/2016 | Trentinaglia | G01C 21/3608 |
| 2017/0103749 A1* | 4/2017 | Zhao | G10L 15/22 |
| 2017/0249934 A1* | 8/2017 | Kang | G06F 3/167 |

* cited by examiner

*Primary Examiner* — Satwant K Singh
(74) *Attorney, Agent, or Firm* — Pierce Atwood LLP

(57) ABSTRACT

Systems and methods for generating command indications, via a computing device, based on audio data including a keyword are described. The computing device receives and processes audio data to determine whether the audio data includes a keyword. The keyword may be a device user identifier, such as an individual's name. Once a keyword is detecting, audio data surrounding the keyword is processed to determine a command contained within the surrounding data, and the command is conveyed to the computing device's user either audibly or visually. Alternatively, a location of the device is determined, a command is determined based on the device's location, and the command is conveyed to a user of the device either audibly or visually.

20 Claims, 22 Drawing Sheets

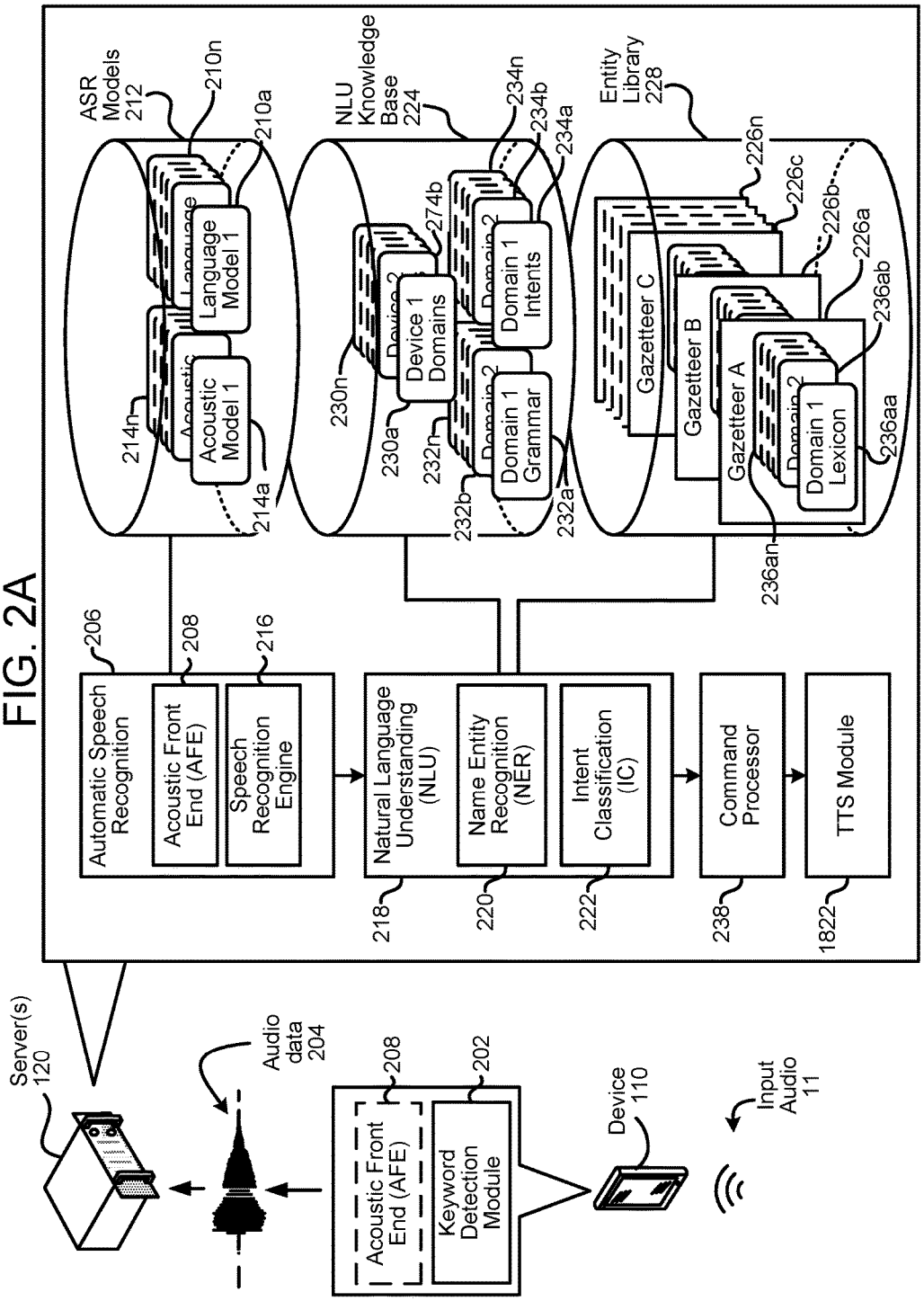

US 10,365,887 B1

GENERATING COMMANDS BASED ON LOCATION AND WAKEWORD

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A is a conceptual diagram of a speech processing system according to embodiments of the present disclosure.

DETAILED DESCRIPTION

Automatic speech recognition ("ASR") is a field of computer science, artificial intelligence, and linguistics concerned with transforming audio data associated with speech into text representative of that speech. Similarly, natural language understanding ("NLU") is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture audio/speech and convert those sounds into an audio signal. The audio signal/data may then be sent to a downstream remote device for further processing, such as converting the audio signal into an ultimate command. The command may then be executed by a combination of remote and local devices depending on the command itself.

Individuals routinely interact with personal computing devices in a variety of locations and in a variety of ways. For example, users may listen to music, watch videos, and play games on mobile devices. Often times, users use earbuds, headphones, etc. to drown out undesirable, environment noise that may interfere with their enjoyment of the mobile device. This may lead to a user being distracted, which may in turn lead to a user missing some event that may be important to the user. For example, a user who is listening to and/or otherwise intently focused on their device may not hear an important public announcement (such as a directive for the user to report to a gate at an airport, or a public transit stop announcement), or may miss another attempt to get the user's attention.

To assist users in these and other situations, the present disclosure provides systems and methods that detect audible keywords/wakewords, such as a user's name or other important information, and processes the audio surrounding the keyword to determine a command. The system then determines how to convey the command to the user (i.e., audibly, visually, and/or via tactile stimulation). The method of conveyance of the command may depend upon factors such as how the user is interacting with and/or what application are running on the device when the keyword is recognized, preconfigured user preferences, the user's location, or other factors.

Figure 1:
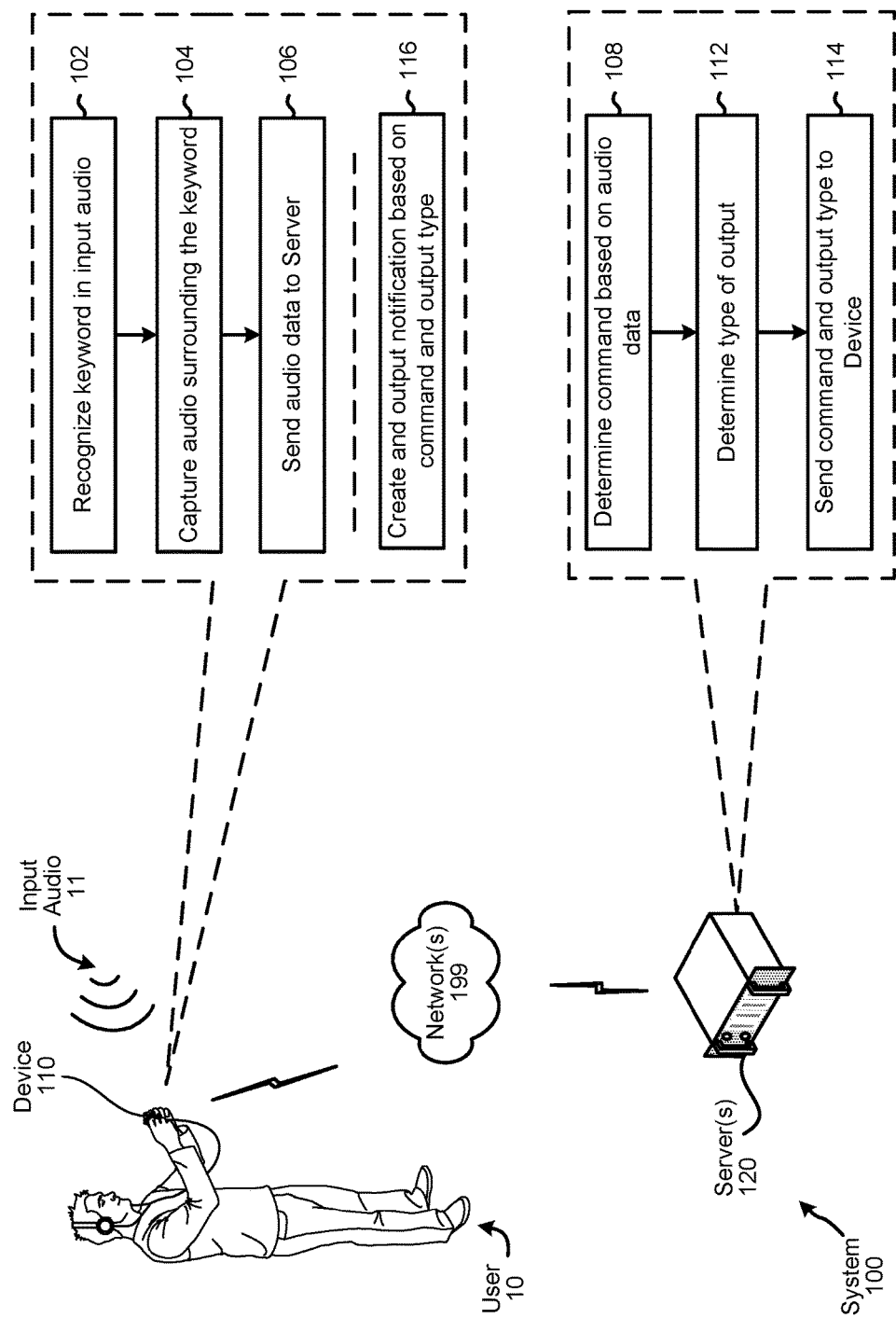
FIG. 1 illustrates a system for creating a keyword and a location based notification in an automatic speech recognition ("ASR") system according to embodiments of the present disclosure.

FIG. 1 illustrates a system 100 for generating and executing commands in an ASR system according to embodiments of the present disclosure. Although FIG. 1, and lower figures/discussion, illustrate the operation of the system 100 in a particular order, the steps described may be performed in a different order (as well as certain steps removed or added) without departing from the intent of the disclosure. As shown in FIG. 1, the system 100 may include one or more devices 110 local to user(s) 10, as well as one or more networks 199 and one or more servers 120 connected to the device 110 across the network(s) 199. While it is described herein below that selection of a particular notification for presentment may be based on how the device 110 is being interacted with, such description is merely illustrative. As such, one skilled in the art should appreciate that selection of a particular notification may be based, at least in part, on various factors such as the location of the device, the user of the device, application(s) being run by the device, or the like. The server(s) 120 (which may be one or more different physical devices) may be capable of performing traditional speech processing (such as ASR, NLU, query parsing, etc.) as described herein. A single server 120 may be capable of performing all speech processing or multiple servers 120 may combine to perform the speech processing. In addition, certain speech detection or command execution functions may be performed by device 110.

As shown in FIG. 1, the device 110 receives audio 11 from the environment of the device 110. In one example, the device 110 may be configured to perform the processes described herein only when an external headset (e.g., earbuds or Bluetooth headset) are operating with or plugged into the device 110. That is, pairing of external audio output means with the device 110 (e.g., via Bluetooth, an audio jack, etc.) may switch the device 110 into a mode that allows the device 110 to perform the processes discussed in detail herein. The device 110 analyzes signals of the input audio 11 as they are received until the device 110 recognizes a keyword within the input audio 11 (illustrated as 102). The keyword may be a user identifying word or phrase, such as the user's name, for example, or may be some other word or phrase configured to activate the device 110 to perform certain operations, as described below. The device 110 then captures audio signals surrounding the keyword (illustrated as 104). For example, the device 110 may capture audio received prior to, during, and/or subsequently to the keyword. In an example, received audio may be buffered by the device 110 for a threshold amount of time, thereby enabling the device 110 to capture audio received prior to recognition and receipt of the keyword audio. The device 110 sends captured audio data to the server 120 via the network(s) 199 (illustrated as 106).

The server 120 receives the audio data and determines a command and corresponding notification based on the audio data (illustrated as 108). For example, the command may include an instruction to notify the user in a particular manner upon detection of the keyword. Execution of the command may use data comprising payload data, which can be audio data corresponding to the recorded input audio 11 and/or Text-to-Speech ("TTS") output data (which may be played back to the user on the device 110), image data or text data (which may be displayed to the user on the device 110), etc. Determination of the command may include the server 120 implementing ASR and/or NLU processes/techniques as described herein. The command may correspond to an action contained within the audio data. The server 120 also determines an output type for presentment of a notification to the user 10 (illustrated as 112). The output may be visual (i.e., displayed on a display of the device 110), audible (e.g., conveyed via a speaker of the device 110 or earbuds/headphones connected to the device 110), or tactile (e.g., conveyed via a haptic output of the device 110). For example, the output may cause the device 110 (or an affiliated device such as a smart watch) to vibrate. The output type may be determined based on a user profile as described herein below with respect to FIG. 13.

The output/notification may be communicated to multiple users via multiple devices. For example, multiple devices may be linked, for example via a user account. When one of the linked devices is to output a notification, another of the linked devices may also output the notification (e.g., if the linked devices are within a proximity distance to each other, if the user has indicated such an output in user preferences, or in other situations).

If the command includes a notification, the server 120 sends the command, notification data, and other output data to the device 110 via the network(s) 199 (illustrated as 114). The device 110 creates a notification and outputs the notification based on the command and output data (illustrated as 116). In an example, the notification may be communicated to the user 10 as audio via a speaker of the device 110 or a wired or wireless headset connected to the device 10 and worn by the user 10. In another example, the notification may be displayed to the user 10 via a display of the device 110, via a flashing light on the device 110, etc.

For example, the device 110 may be outputting audio (for example, corresponding to music being played through headphones) to the user 10 while the device 110 and server 120 perform the processes described hereinabove with respect to FIG. 1. In this example, the notification instruction sent to the local device 110 may also result in the device 110 ceasing/pausing output of the music to the user 10 until after the notification is output to the user 10. After output of the notification to the user 10 is complete, the device 110 may then again resume playback of the music to the user 10.

The device 110 may continue to execute the command (e.g., output the notification) until certain conditions are met. For example, the device 110 may output the notification a certain number of times, after which the device 110 may resume any pre-notification activity depending upon implementation options. For further example, the device 110 may output a notification until the user 10 acknowledges receipt of the notification. The user's acknowledgement may be audible or physical (i.e., the user 10 may say it received the notification or the user 10 may perform a gesture on a display of the device 110 that indicates the user 10 has received the notification). The notification itself may also include an acknowledgement button or other user interface element that the user 10 can select to acknowledge the notification.

Figure 4:
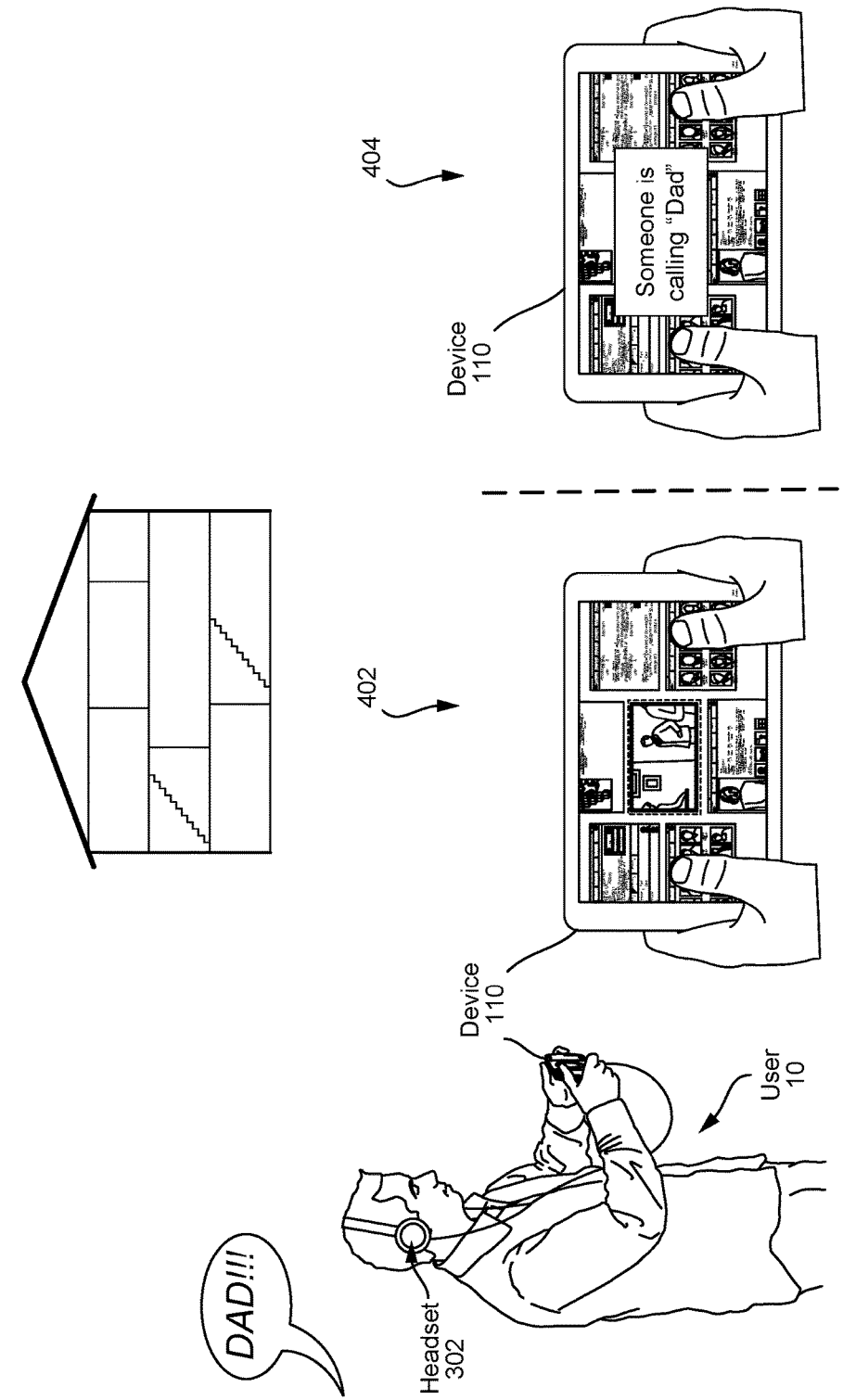
FIG. 4 illustrates a location and keyword based notification according to embodiments of the present disclosure.

It should also be appreciated that the device 110 may continue to output originally output content to the user 10 while the device 110 outputs the notification to the user 10. Whether the device 110 ceases or pauses output of the original content to the user 10 while the device 110 outputs the notification to the user 10 may depend on whether the originally output content would interfere with output of the notification. For example, if the original content output to the user 10 by the device 110 was audio and the notification output type is textual, it may not be necessary to cease output of the original audio while the textual notification is displayed to the user 10 (though the textual output may be accompanied by an audible signal, such as a beep, brief alert message, or other sound). Moreover, if the original content being consumed by the user 10 using the device 110 was strictly visual (i.e., without associative audio) and the notification output type is audio, it may not be necessary to cease output of the original visual content while the audible notification is communicated to the user 10. In another example, if the original content output to the user 10 by the device 110 was either audio data or a combination of video and audio data, and the notification output type is audio, it may be beneficial to cease output of the original content while the audible notification is communicated to the user 10. Alternatively, instead of ceasing output of the original audible content entirely, the device 110 may be configured to layer notification audio data over the original audible content (i.e., the original audible content may be transmitted at a lower decibel level than the audible notification, with both of the audios being transmitted simultaneously). In yet another example, if the original content output to the user 10 by the device 110 was visual (with or without associated audio) and the notification output type is textual, it may be beneficial to cease or pause display of the original visual content while the textual notification is displayed to the user 10. Alternatively, instead of ceasing output of the original visual content, the device 110 may be configured to superimpose the textual notification over the original visual content (i.e., simultaneously display the original visual content in a background of a display while the textual notification is displayed in a foreground of the same display) as illustrated in FIG. 4, for example. In another example, the audible and/or visual content may be sent to the local device 110 by the server 120 (such as in a streaming context). The server may then interrupt the audible/visual stream to output the notification to the user through the local device 110.

The device 110 may output the notification in real-time with receiving the notification instruction and output data from the server 120. Alternatively, the device 110 and/or the server 120 may buffer the output data until receiving a user provided indication to transmit/display the output data (for example, following an alert and prompt for the user 10 to allow display of further information).

The device 110 may be configured to perform the processes described herein continually (i.e., whenever the device 110 is turned on). Alternatively, the device 110 may be configured to only perform the processes described herein when the user 10 is interacting with the device 110 in a particular manner (e.g., when a headset is connected to the device 110), only when the device is in a certain location (e.g., home, airport) or under other conditions (e.g., when the device is traveling at a certain speed). The system 100 may also be configured to output notifications based on other conditions beyond keyword initiated notifications, such as based on received images, locations, etc.

FIG. 2A is a conceptual diagram of how a spoken utterance is traditionally processed, allowing a system to capture and output spoken commands via a device, such as spoken commands that may follow a wakeword/keyword. The various components illustrated may be located on a same or different physical devices. Communication between various components illustrated in FIG. 2A may occur directly or across the network(s) 199. An audio capture component, such as a microphone of the device 110, captures audio 11 corresponding to a spoken utterance. The device 110, using a keyword detection module 202, then processes the audio, or audio data corresponding to the audio, to determine if a keyword (such as a wakeword) is detected in the audio. Following detection of a wakeword, the device 110 sends audio data 204, corresponding to the utterance, to the server 120, which includes an ASR module 206. The audio data 204 may be output from an acoustic front end (AFE) 208 located on the device 110 prior to transmission. Alternatively, the audio data 111 may be in a different form for processing by a remote AFE 208, such as the AFE 208 located with the ASR module 206.

The keyword detection module 202 works in conjunction with other components of the device 110, for example a microphone (not pictured) to detect keywords in audio 11. For example, the device 110 may convert audio 11 into audio data, and process the audio data with the keyword detection module 202 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the keyword detection module 202 to capture audio surrounding an identified keyword. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the keyword detection module 202 may compare audio data to stored models or data to detect a keyword. One approach for keyword detection applies general large vocabulary continuous speech recognition (LVCSR) systems to decode the audio signals, with keyword searching conducted in the resulting lattices or confusion networks. LVCSR decoding may require relatively high computational resources. Another approach for keyword spotting builds hidden Markov models (MINI) for each keyword and non-keyword speech signals respectively. The non-keyword speech includes other spoken words, background noise, etc. There can be one or more HMMs built to model the non-keyword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the keyword spotting system may be built on deep neural network (DNN)/recursive neural network (RNN) structures directly, without HMM involved. Such a system may estimate the posteriors of keywords with context information, either by stacking frames within a context window for DNN, or using RNN. Following-on posterior threshold tuning or smoothing is applied for decision making. Other techniques for keyword detection, such as those known in the art, may also be used.

Once a wakeword is detected, the local device 110 may "wake" and begin transmitting audio data 204 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 204 may include data corresponding to the wakeword, or the portion of the audio data corresponding to the wakeword may be removed by the local device 110 prior to sending. Further, the local device 110 may "wake" upon detection of speech/spoken audio above a threshold, as described herein. Upon receipt by the server(s) 120, an ASR module 206 may convert the audio data 204 into text. The ASR module 206 transcribes audio data into text data representing the words of the speech contained in the audio data. The text data may then be used by other components for various purposes, such as executing system commands, inputting data, etc. A spoken utterance in the audio data 204 is input to a processor configured to perform ASR which then interprets the utterance based on the similarity between the utterance and pre-established language models 210 stored in an ASR model storage 212. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 214 stored in an ASR Models Storage 212), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 206 outputs the most likely text recognized in the audio data. The ASR process may also output multiple hypotheses in the form of a lattice or an N-best list with each hypothesis corresponding to a confidence score or other score (such as probability scores, etc.).

The device(s) performing the ASR processing may include an acoustic front end (AFE) 208 and a speech recognition engine 216. The acoustic front end (AFE) 208 transforms the audio data 204 from the microphone into data for processing by the speech recognition engine 216. The speech recognition engine 216 compares the speech recognition data with acoustic models 214, language models 210, and other data models and information for recognizing the speech conveyed in the audio data. The AFE 208 may reduce noise in the audio data 204 and divide the digitized audio data 204 into frames representing time intervals for which the AFE 208 determines a number of values, called features, representing the qualities of the audio data 204, along with a set of those values, called a feature vector, representing the features/qualities of the audio data 204 within the frame. Many different features may be determined, as known in the art, and each feature represents some quality of the audio that may be useful for ASR processing. A number of approaches may be used by the AFE 208 to process the audio data 204, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 216 may process the output from the AFE 208 with reference to information stored in the speech/model storage 212. Alternatively, post front-end processed data (such as feature vectors) may be received by the device executing ASR processing from another source besides the internal AFE 208. For example, the device 110 may process the audio data 204 into feature vectors (for example using an on-device AFE 208) and transmit that information to the server 120 across the network 199 for ASR processing. Feature vectors may arrive at the server 102 encoded, in which case they may be decoded prior to processing by the processor executing the speech recognition engine 216.

The speech recognition engine 216 attempts to match received feature vectors to language phonemes and words as known in the stored acoustic models 214 and language models 210. The speech recognition engine 216 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 216 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 216 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing 218, such as conversion of the text into commands for execution, either by the device 110, by the server 120, or by another device (such as a server running a specific application like a search engine, etc.).

The device performing the NLU processing 218 (e.g., the server 120) may include various components, including potentially dedicated processor(s), memory, storage, etc. A device configured for NLU processing 216 may include a named entity recognition (NER) module 220 and an intent classification (IC) module 222, a result ranking and distribution module (not illustrated), and a knowledge base 224. The NLU process 218 may also utilize gazetteer information (226a-226n) stored in an entity library storage 228. The gazetteer information (226a-226n) may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 218 takes textual input (such as processed from ASR 206 based on the utterance 11) and attempts to make a semantic interpretation of the text. That is, the NLU process 218 determines the meaning behind the text based on the individual words and then implements that meaning. NLU processing 218 interprets a text string to derive an intent or a desired action from the user as well as the pertinent pieces of information in the text that allow a device (e.g., the device 110) to complete that action. For example, if the spoken utterance 11 is processed using ASR 206 and outputs the text "call mom" the NLU process 218 may determine that the user intended to activate a telephone in his/her device and to initiate a call with a contact matching the entity "mom."

The NLU 218 may process several textual inputs related to the same utterance. For example, if the ASR 206 outputs N text segments (as part of an N-best list), the NLU 218 may process all N outputs to obtain NLU results.

The NLU process 218 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 218 may be configured to determine a "domain" of the utterance so as to determine and narrow down which services offered by the endpoint device (e.g., the server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 220 receives a query in the form of ASR results and attempts to identify relevant grammars and lexical information that may be used to construe meaning. To do so, the name entity recognition module 220 may begin by identifying potential domains that may relate to the received query. The NLU knowledge base 224 includes a database(s) of devices (230a-230n) identifying domains associated with specific devices. For example, the device 110 may be associated with domains for music, telephony, calendaring, contact lists, and device-specific communications, but not video. In addition, the entity library 228 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database (232a-232n), a particular set of intents/actions (234a-234n), and a particular personalized lexicon (236). Each gazetteer (226a-226n) may include domain-indexed lexical information associated with a particular user and/or device. For example, the Gazetteer A (226a) includes domain-index lexical information 236aa to 236an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 222 parses the query to determine an intent or intents for each identified domain, where the intent corresponds to the action to be performed that is responsive to the query. Each domain is associated with a database (234a-234n) of words linked to intents. For example, a music intent database may link words and phrases such as "quiet," "volume off," and "mute" to a "mute" intent. The IC module 222 identifies potential intents for each identified domain by comparing words in the query to the words and phrases in the intents database 234.

In order to generate a particular interpreted response, the NER 220 applies the grammar models and lexical information associated with the respective domain. Each grammar model 232 includes the names of entities (i.e., nouns) commonly found in speech about the particular domain (i.e., generic terms), whereas the lexical information 236 from the gazetteer 226 is personalized to the user(s) and/or the device. For instance, a grammar model associated with the shopping domain may include a database of words commonly used when people discuss shopping.

The intents identified by the IC module 222 are linked to domain-specific grammar frameworks (included in 232) with "slots" or "fields" to be filled. For example, if "play music" is an identified intent, a grammar (232) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 220 may parse the query to identify words as subject, object, verb, preposition, etc., based on grammar rules and models, prior to recognizing named entities. The identified verb may be used by the IC module 222 to identify intent, which is then used by the NER module 220 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 220 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 222 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazetteer for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 220 may search the database of generic words associated with the domain (in the NLU's knowledge base 224). So for instance, if the query was "play songs by the rolling stones," after failing to determine an album name or song name called "songs" by "the rolling stones," the NER 220 may search the domain vocabulary for the word "songs." In the alternative, generic words may be checked before the gazetteer information, or both may be tried, potentially producing two different results.

The comparison process used by the NER module 220 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 220 may also use contextual operational rules to fill slots. For example, if a user had previously requested to pause a particular song and thereafter requested the voice-controlled device to "please un-pause my music," the NER module 220 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 238, which may be located on a same or separate server 120 as part of the system 100. The destination command processor 238 may be determined based on the NLU output. For example, if the NLU output includes a command to play music, the destination command processor 238 may be a music playing application, such as one located on the device 110 or in a music playing appliance, configured to execute a music playing command. If the NLU output includes a search request, the destination command processor 238 may include a search engine processor, such as one located on a search server, configured to execute a search command.

Figure 2B:
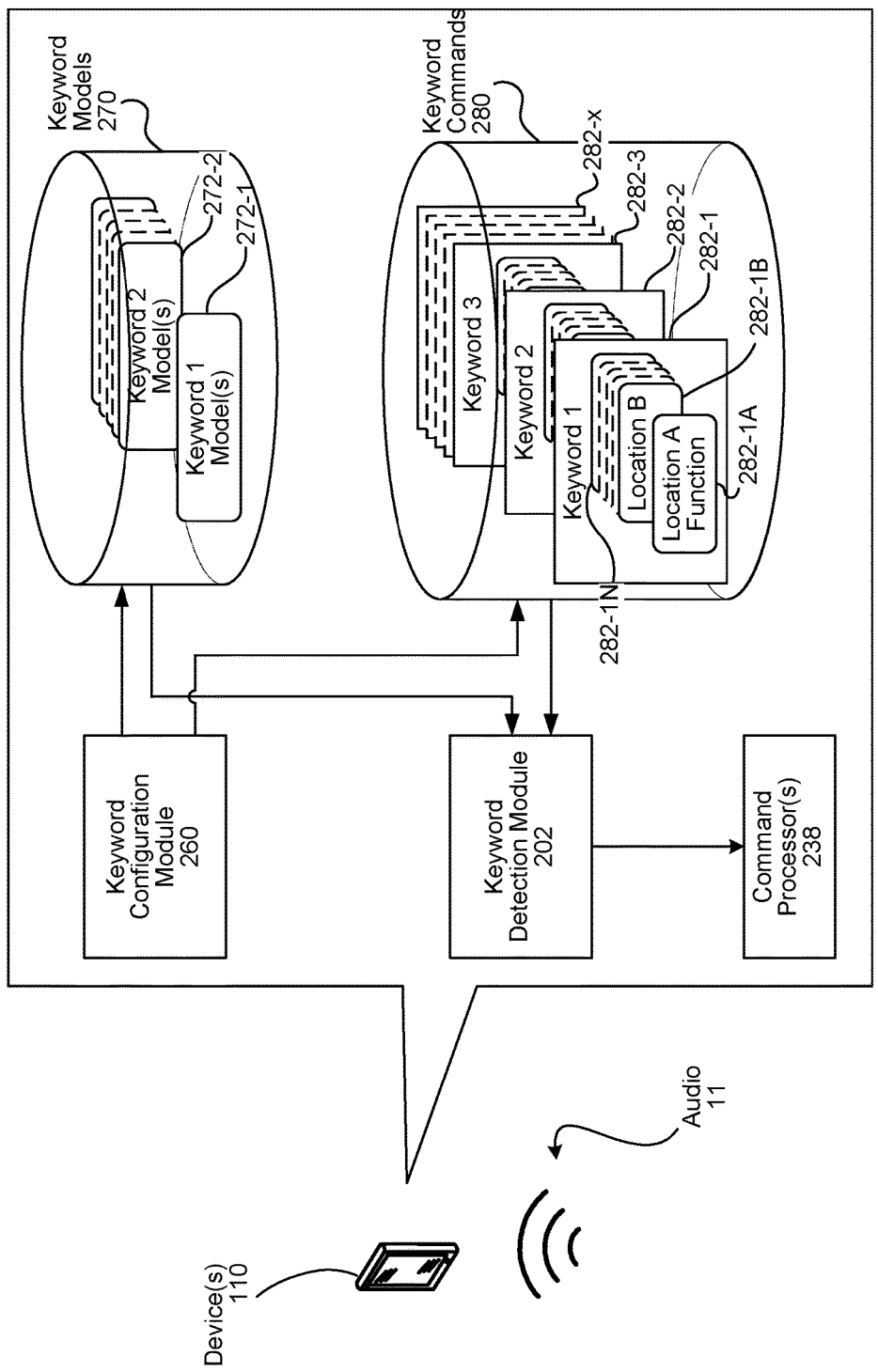
FIG. 2B is a conceptual diagram of components for keyword configuration and detection according to embodiments of the present disclosure.

As noted above, in addition to detecting keywords that result in a waking command, detection of a keyword may result in another command being performed by the system. As illustrated in FIG. 2B, a device 110 may include a number of components for keyword configuration, keyword detection, and keyword command execution. Although the components are illustrated as part of device 110, they may also be included in other devices, such as server 120 or spread across multiple devices 110 and/or servers 120. For example, a server 120 may include the keyword detection module 202 and command processor 238 whereas the local device 110 may include the keyword detection module 202 (such as in a situation where the local device 110 is primarily used for inputting and outputting audio but the server 120 handles more complex tasks).

The keyword detection module 202 works in conjunction with other components of the device 110, for example a microphone (not pictured) to detect keywords in audio 11. For example, the device 110 may convert audio 11 into audio data, and process the audio data with the keyword detection module 202 to determine whether speech is detected, and if so, if the audio data comprising speech matches an audio signature and/or model corresponding to a particular keyword.

A keyword configuration module 260 may configure the system 100 to recognize a keyword. The keyword configuration module 210 may import models or data into keyword model storage 270. Each keyword may be associated with a plurality of models to allow the system to recognize the keyword in a number of different situations (loud, noisy, etc.) and with a number of different speakers. Thus the keyword model storage 270 may include models for each keyword the system is configured to recognize, such as keyword 1 model(s) 272-1, keyword 2 model(s) 272-2, etc.

In this respect, the system may be pre-programmed with a limited number of keyword spotting models/audio signatures corresponding to the sounds of the respective keywords. The models may include audio signatures corresponding to the specific keywords of the system. The keywords may be preconfigured (for example, set by a manufacturer of a device) or may be selected by a user, application developer, etc. The models to recognize the keywords may also include pattern recognition type models to assist in determining when a portion of audio data matches one or more of the models. The models correspond to specific sounds so that a device may perform limited recognition of the keyword without necessarily having the capabilities of a more robust ASR system including acoustic models, language models, etc. The device simply matches incoming audio to the models and if a match is detected, the user device determines what keyword corresponds to the matched model and then determines and/or executes the command that is associated with the keyword and the context of the system (for example, the location of the user, what application is running on a device, etc.). Such configuration settings may be stored, for example, in user profiles 1302 discussed below with reference to FIG. 13. Such limited keyword spotting is more limited than full ASR, but also requires fewer computing resources. Further, such a keyword spotting system may operate under conditions where full speech processing may not be available, for example when a local device 110 is capable of keyword detection (and resulting command execution) but is unable to connect with a server 120 that performs ASR/NLU, like when a network connection becomes unavailable. Further, this keyword spotting system may run in the background of other applications the user may be operating, thus allowing the system to notify the user when notifications are missed.

Figure 2C:
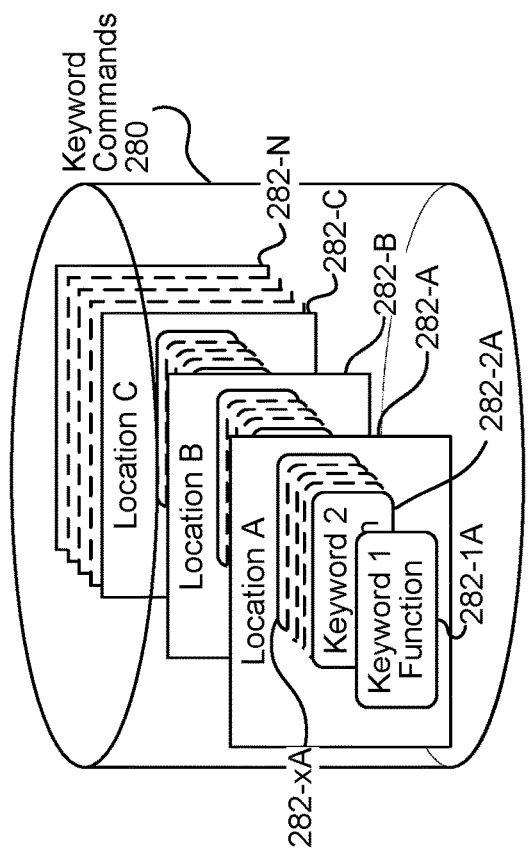
FIG. 2C is a conceptual diagram illustrating a component for storing keyword commands according to embodiments of the present disclosure.

The keyword configuration module 260 may also configure each keyword with a plurality of commands, where each particular command is associated with a particular context of a device, such as a device location. The keyword configuration module 260 may associate each keyword with its related commands and store that association in keyword command storage 280. This association may take place remotely, at a server 120 associating keywords to commands. The associations may be stored in different ways. As shown in FIG. 2B, data may be stored associating each keyword with the different commands for each potential application. Thus, as illustrated, a data structure for keyword 1 282-1 may include commands for location A (282-1A), a command for location B (282-1B), and so on for each stored location until location N (282-1N). Similar data structures may exist for each keyword including keyword 2 (282-2), keyword 3 (282-3) all the way to keyword X (282-x). In another example, keyword-command relationships may be organized according to location, thus allowing the system to call up different keyword-command relationships when a device is at a certain location, thus potentially speeding up execution of a particular command when a keyword is recognized at its associated location. For example, as shown in FIG. 2C, a data structure for location A (282-A) may include commands associated with keyword 1 (282-1A), keyword 2 (282-2A) through keyword X (282-xA). Similar data structures may exist for each location, such as location B (282-B), location C (282-C), until location N (282-N). Other forms of organizing data linking keywords, commands and locations (and potentially models 272) may also be used.

As illustrated, each keyword may be associated with one or more models 232 such that the keyword detection module 220 may compare audio data to the model(s) 232 to detect a keyword. The model(s) 232 may be preconfigured (for example configured prior to delivering a device 110 to a user) or may be trained by the system after a device 110 has been used by a user. The model(s) may be customized, for example during a training session allowing a user to train the system 100 on how the user may speak a specific keyword. Thus a model may be associated with a particular user, user ID, user profile, etc.

During runtime, if a keyword is detected using the model (s) 272, the keyword detection module 202 may send an indication to the command processor 238 so the command processor may execute the appropriate command. The indication or message sent from the keyword detection module 202 may include an indication of the detected keyword itself or may include only an indication of the command to be performed. The command processor 238 (which may be local to device 110 or may be located on a remote server 120) may then execute the command, which may include sending a notification to the local device 110 to the user. As can be appreciated, the command processor 238 that receives the indication may be different depending on the desired command. For example, if the keyword command relates to music playback, the keyword detection module 202 may send the indication to the command processor 290 associated with a music application or playback command (which may, for example, be located at server 120). In another example, if the keyword command and location relates to a text notification to the user, the keyword detection module 202 may send the indication to the command processor 238 associated with a text messaging service of the user. Further, the indication may be sent to multiple command processors 238 depending on the command(s) associated with the keyword. Various different command processors 238 may be incorporated as part of the system 100.

Figure 3:
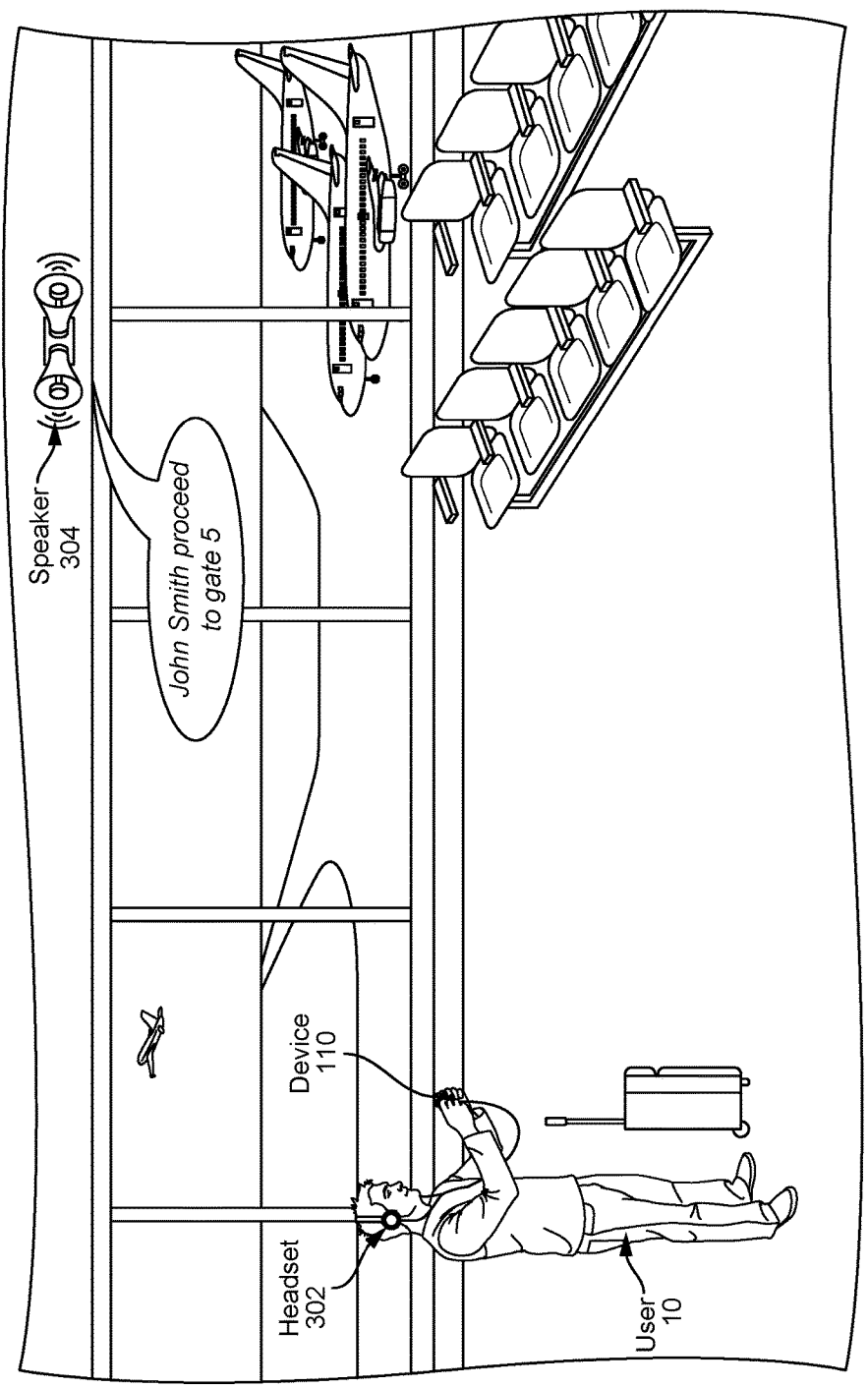
FIG. 3 illustrates a location and keyword based notification according to embodiments of the present disclosure.

The speech processing system 100 may be used in a variety of scenarios and implementations to detect keywords and execute commands (e.g., convey notifications to a user). FIG. 3 illustrates an example scenario in which the speech processing system 100 may be used. According to FIG. 3, the user 10 may be at a public area (e.g., an airport). The device 110 may use certain location detecting component(s), such as a GPS signal, to detect that the device 110 is at the airport. Based on the device 110 being at the airport, the device 110 may activate a setting corresponding to what keyword(s) the device 110 should detect at the airport for purposes of notifying the user 10 if a keyword is detected. The device 110 may store a lookup table identifying which keyword(s) to activate at which locations. Or the device 110 may access a user profile (either locally or through communications with server 120) that indicates what keyword(s) should be listened for at what locations. In the example of FIG. 3, the device 110 may detect that it is at the airport and may configure itself to listen for certain keywords. One of those keywords may be the user's name, for example John Smith. The user 10 (i.e., John Smith) may be interacting with the device 110 using a wired or wireless headset 302. For example, the user 10 may be listening to music or watching a video on the device 110. An announcement may originate from a speaker 304 of the public area (i.e., airport). The announcement may include the user's name and a command (e.g., "John Smith, proceed to gate 5."). Since the user 10 is using the headset 302, the user 10 may not hear the announcement. The device 110, however, determining that the device 110 is at the airport, is also configured to perform a command upon detecting the keyword of "John Smith." Thus, the device 110 may recognize the user's name in the announcement as a keyword, capture audio surrounding the user's name, and send the captured audio to the server 120 for processing as described herein. The server 120 may then receive the audio, process the audio using ASR and/or NLU techniques, determine what command to execute (such as a notification to the device 110) and may execute the command, for example sending an SMS (short message service) text message to the device 110 including text corresponding to the audio emitted by speaker 304.

The notification output to the user 10 by the device 110 may solely include the audio output by the speaker 304 and captured by the device 110 upon recognition of the keyword. Alternatively, the notification output to the user 10 may include a first portion composed of text-to-speech (TTS) data (generated based upon the audio captured by the device 110 in response to recognition of the keyword) and a second portion composed of a portion of the audio captured by the device 110. Furthermore, the notification output to the user 10 may include solely include TTS data generated based upon the audio captured by the device 110 in response to recognition of the keyword.

The local device 110 may store the audio data surrounding the keyword locally. This allows the server 120 to send a message/command/indication to the device 110 that directs the device 110 to merely output the captured audio that surrounded the recognized keyword. Alternatively (or in addition), the local device 110 may send the audio data surrounding the keyword to the server 120, which may then send back to the local device portions of the audio data back to the local device 110 accompanied by an instruction to output the portions.

FIG. 4 illustrates an example scenario in which the speech processing system 100 may be used. According to FIG. 4, the user 10 may be at home. The device 110 may use certain location detecting component(s), such as a GPS signal or WiFi network ID, to detect that the device 110 is at the user's home. Based on the device 110 being at the user's home, the device 110 may activate a setting corresponding to what keyword(s) the device 110 should detect for purposes of notifying the user 10 if a keyword is detected. One of those keywords may be the user's name or other word, for example "dad." The user 10 may be interacting with the device 110 using a wired or wireless headset 302. For example, the user 10 may be listening to music or watching a video on the device 110 as shown in 402 of FIG. 4. Someone in the house may say or shout "dad." Since the user 10 is using the headset 302, the user 10 may not hear someone trying to get his attention. The device 110, however, determining that the device 110 is at the user's home, is also configured to perform a command upon detecting the keyword of "dad." Since the word "dad" may be orated frequently at the user's home, detecting of the word "dad" may be required to be said at or above a certain amplitude or volume in order to be result in a notification, thereby preventing the generation of unnecessary notifications. Thus, the device 110 may recognize the keyword, capture audio surrounding the keyword, and send the captured audio to the server 120 for processing as described herein. The server 120 may then receive the audio, process the audio using ASR and/or NLU techniques, determine what command to execute (such as send a notification to the device 110) and may execute the command, for example sending an instruction to the device 110 to display a notification on the device 110, as shown in 404 of FIG. 4. The instruction may involve a message to device 110 to display the notification or may include an SMS message, or other message that the device will process as it would a normal incoming such message.

Figure 5:
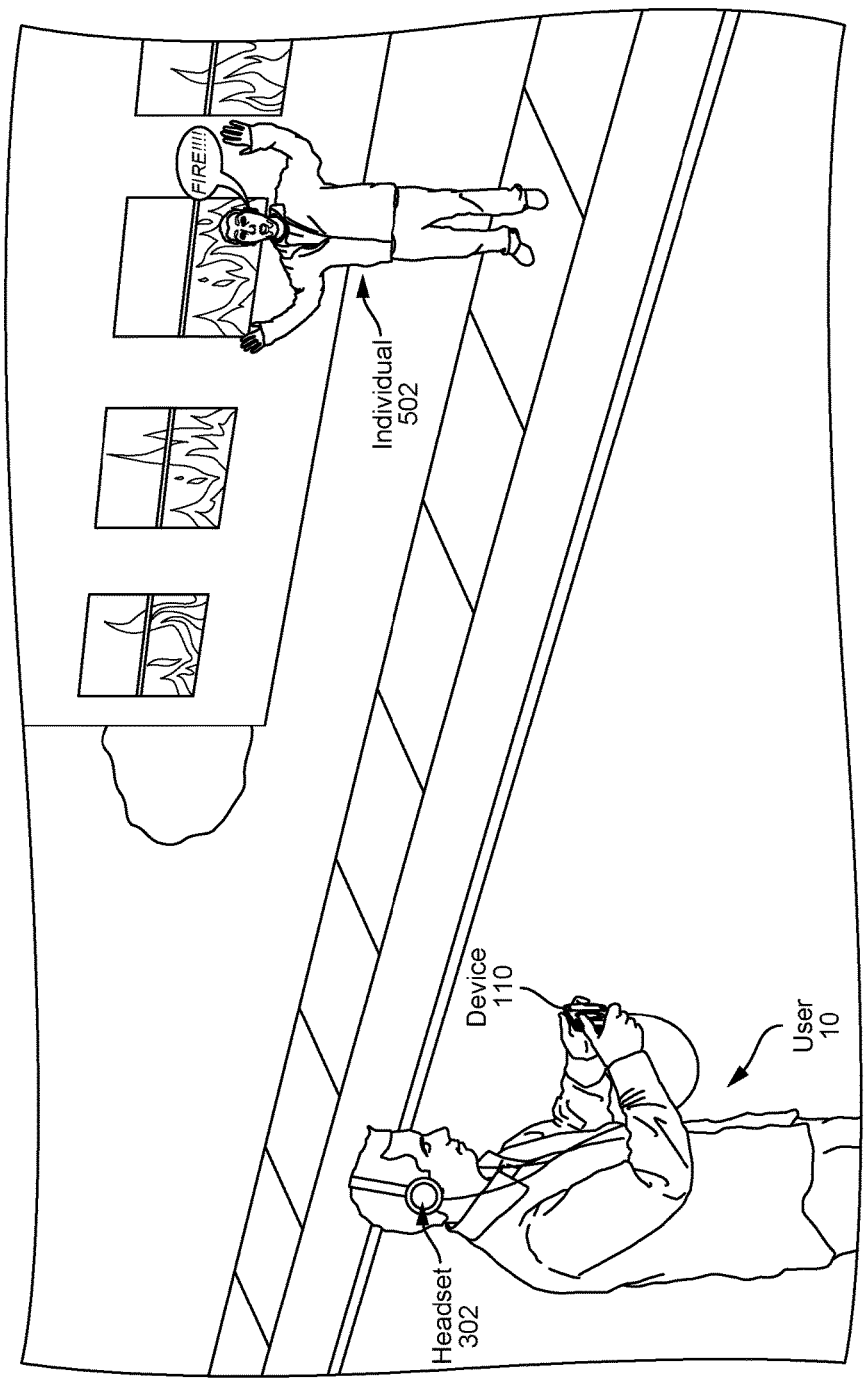
FIG. 5 illustrates a keyword based notification according to embodiments of the present disclosure.

FIG. 5 illustrates a further example scenario in which the speech processing system 100 may be used. According to FIG. 5, the user 10 may be at a public area (e.g., an airport, park, arena, etc.) where the user 10 may be interacting with the device 110 using a wired or wireless headset 302. For example, the user 10 may be listening to music or watching a video on the device 110. Using location components, the device 110 may determine that the device 110 is at a location that may be classified, for example, as "outdoors." Therefrom, the device 110 may configure itself to recognize keywords corresponding to the category "outdoors." An announcement may originate from a speaker 304 or an individual 502 may speak something of importance/interest. For example, the individual 502 or speaker 304 may indicate there is a fire or other public emergency at the public area. Importance or interest of speech may be determined based on frequency, amplitude, content, and the like. Since the user 10 is using the headset 302, the user 10 may not hear the announcement/speech. Thus, the device 110 may recognize the importance of the content in the announcement or speech as a keyword (e.g., "fire"), capture audio surrounding the important content, and send the captured audio to the server 120 for processing as described herein.

Figure 6:
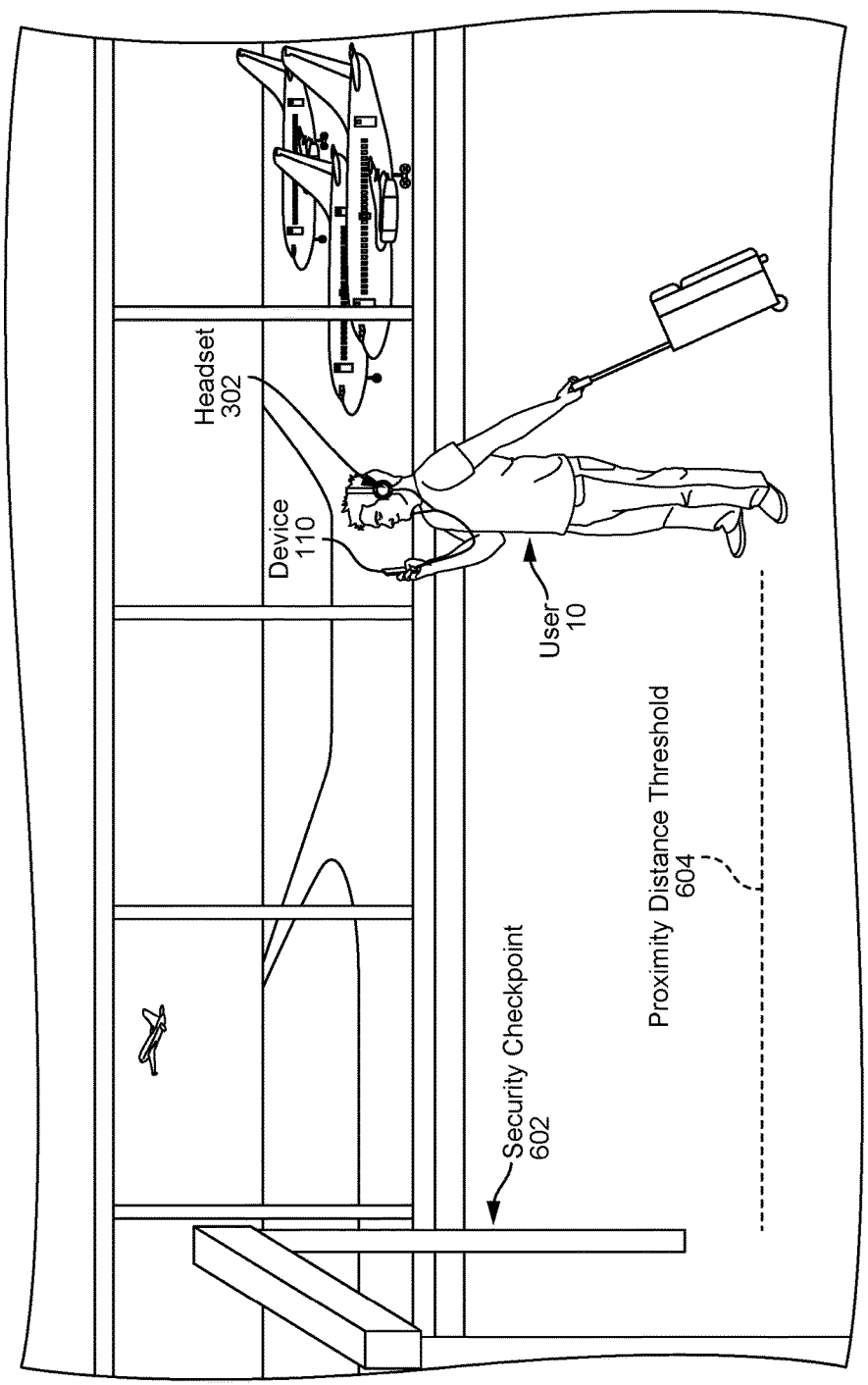
FIG. 6 illustrates location based notification according to embodiments of the present disclosure.

FIG. 6 illustrates another example scenario in which the system 100 may be used. According to FIG. 6, the user 10 may be at a public area (e.g., an airport) where the user 10 may be interacting with the device 110 using a wired or wireless headset 302. For example, the user 10 may be listening to music or watching a video on the device 110. The user 10 may be moving toward a location of the public area within which it may be undesirable for the user 10 to be interacting with the device 110. Such a location may include a security checkpoint 602 of an airport, arena, or other like public, secure area. Since the user 10 is interacting with the device 110, the user 10 may not notice they are approaching the location in which use of the device 110 is undesirable. Using location determining components, such as a GPS, the device 110 may determine the device 110 is within a proximity distance threshold 604 of the location as a keyword, and send a location/proximity indication to the server 120 for processing as described herein. In an example, a portion of a command may cause the device 110 to cease output of content to the user 10 when it is determined the device 110 is within the proximity distance threshold 604. It may also be determined when the device 110 has exited the proximity distance threshold 604, at which time a command may be generated that at least partially causes the device 110 to resume output of original content to the user 10 (which was ceased when the device 110 entered the proximity distance threshold 604).

Figure 7:
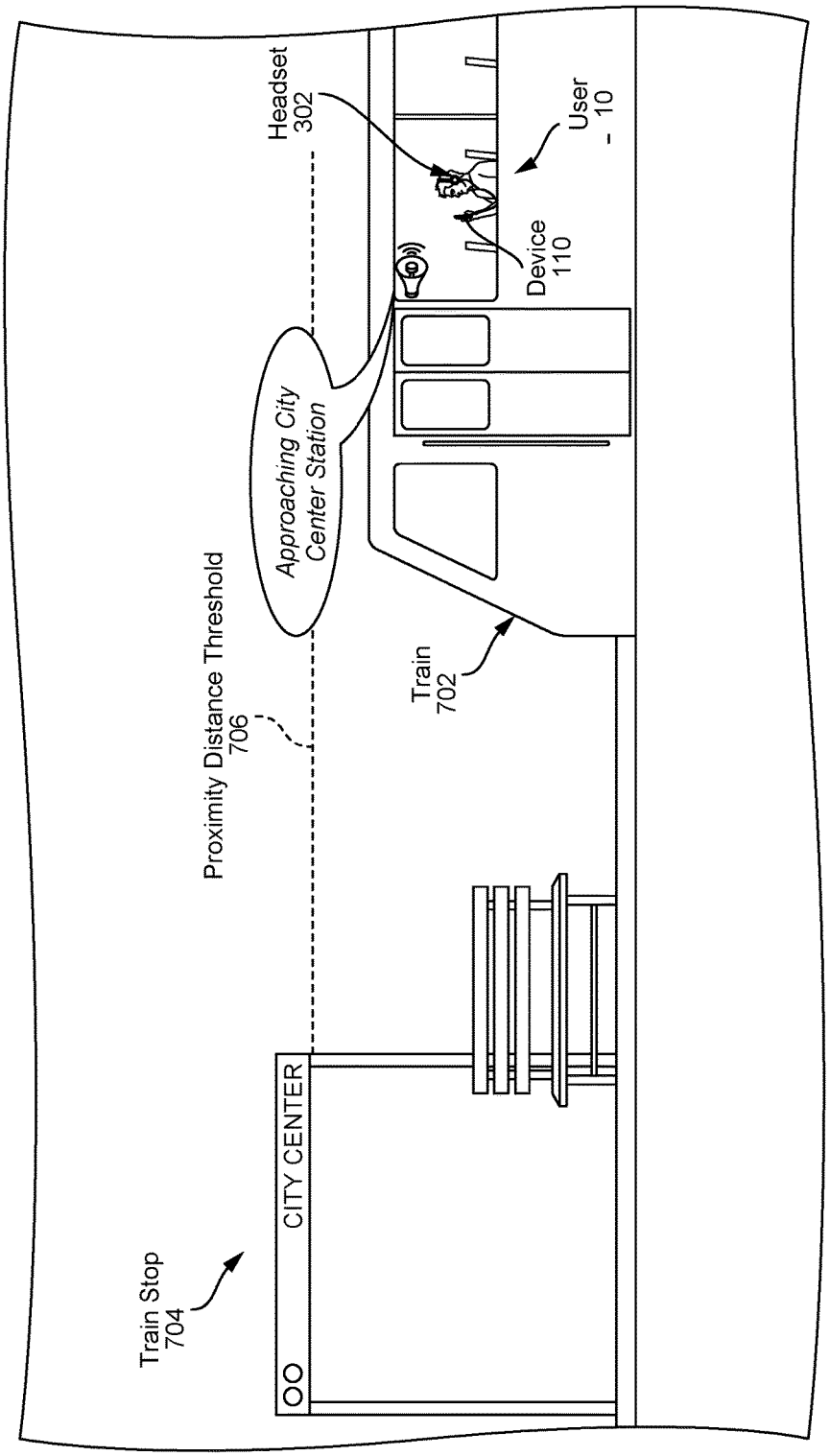
FIG. 7 illustrates location based notification according to embodiments of the present disclosure.

FIG. 7 illustrates another example scenario in which the system 100 may be used. According to FIG. 7, the user 10 may be traveling via a train 702 or other mode of transportation (e.g., a bus, taxi, etc.) during which the user 10 may be interacting with the device 110 using a wired or wireless headset 302. For example, the user 10 may be listening to music or watching a video on the device 110. The user 10 may be moving toward a train stop 704, or another location of interest depending upon the mode of transportation, at which it may be desirable for the user 10 to be packed up and ready to leave the public mode of transportation. Since the user 10 is interacting with the device 110, the user 10 may not notice they are approaching the train stop 704. Thus, the device 110 may determine it is within a proximity distance threshold 706 of the train stop and a corresponding notification may be generated. Alternatively, the device 110 may send location data to the server 120, which may determine the device 110 is within the proximity distance threshold 706. Alternatively or in addition, a train conductor or train public announcement system may announce the train is nearing a particular train stop. In this example, the device 110 recognizes "train stop" or some portion of the actual name of the stop (e.g., "City Center Station") as a keyword, and performs processes as described herein in response to the detection of keywords.

Figure 8:
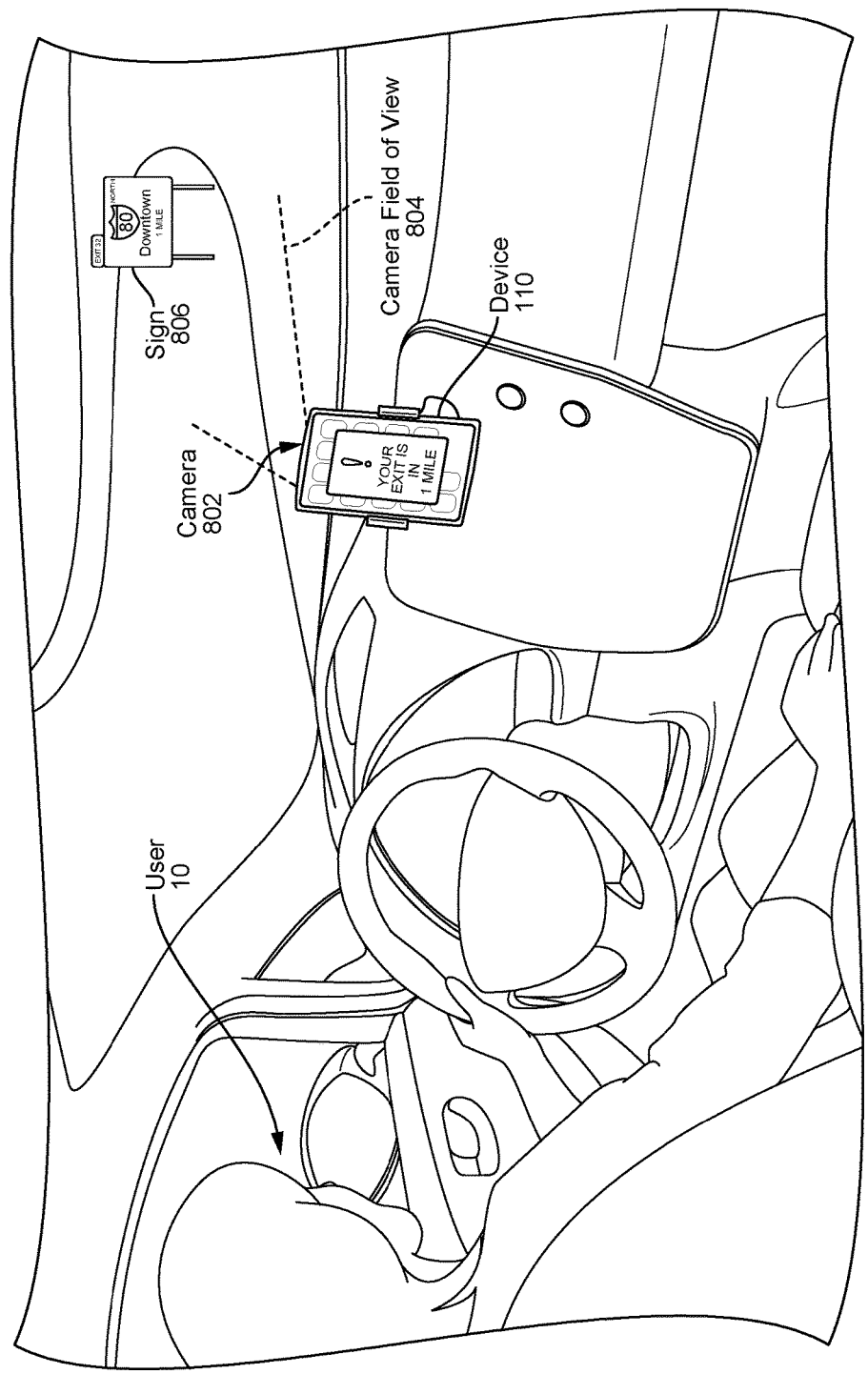
FIG. 8 illustrates image based notification according to embodiments of the present disclosure.

FIG. 8 illustrates a further example scenario in which the system 100 may be used. According to FIG. 8, the device 110 may have a camera 802 configured to capture images. The camera 802 has a field of view 804 associated therewith. The camera 802 may be configured to recognize objects within its field of view 804, such as the sign 806, for example. The device 110 may create image data including the image of the sign 806 viewed by the camera 802, and send the image data to the server 120 for processing as described herein. The device 110 may receive a command and an output type, thereafter. It should be appreciated that the user 10 may or may not be interacting with the device 110 when the image data is created, and that the user 10 may or may not be interacting with the device 110 via the headset 302 when the image data is created.

For example, according to the teachings of FIG. 8, the user 10 may being driving a vehicle with the device 110 placed on the vehicle's dashboard such that the camera 802 of the device 110 has a field of view 804 capable recognizing road signs. The camera 802 may create image data corresponding to a road sign (e.g., a 1 mile from exit road sign), and send the image data to the server 120. The server 120 may process the image data to determine the image data includes a recognizable object (e.g., content corresponding to the sign in the image being 1 mile from a freeway exit). The server 120 may generate and send a command to the device 110, which causes the device 110 to notify the user that they are 1 mile from the freeway exit.

Figure 9:
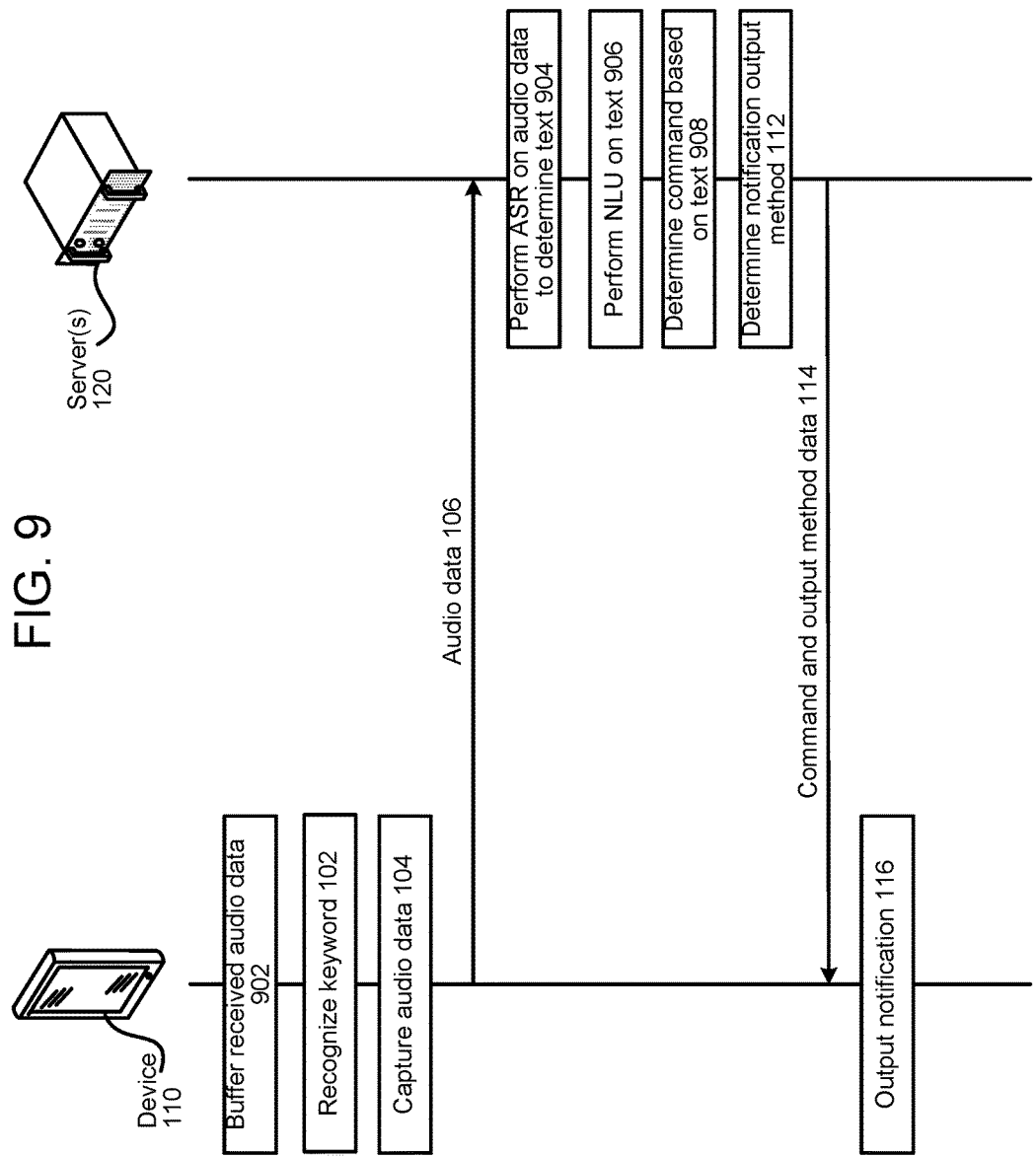
FIG. 9 data exchanges for generating and executing commands in an ASR system according to embodiments of the present disclosure.

FIG. 9 illustrates data exchanges involved when performing speech processing according to embodiments of the present disclosure. The device 110 may be configured to capture audio data and store it in a buffer for a threshold amount of time (illustrated as 902). When the device 110 recognizes a keyword in the audio data (illustrated as 102), the device 110 captures/compiles audio data received prior to, during, and after receipt of the keyword audio data (illustrated as 104). The device 110 may determine which keyword to recognize (i.e., what keyword the device should be searching for in received audio) based on the device's location. As keyword searching may be computationally intensive, configuring the device to detect different keyword(s) at different location(s) may allow the device to avoid unnecessary processing. The amount of audio data captured prior to and after receipt of the keyword may be capped at a time frame beyond which audio is deemed irrelevant to the keyword with some degree of certainty or may be limited by a buffer size or other considerations. For example, audio data received by the device 110 may be stored in a buffer of the device 110 such that, when keyword audio data is recognized by the device 110, all of the audio data within the buffer is from a timeframe within the threshold time frame. The captured audio data is sent to the server 120 (illustrated as 106). Depending upon implementation, the device 110 may also send the server 120 location data corresponding to the device's location so that the server 120 may determine a command to execute based on the location.

The server 120 performs ASR on the audio data to determine corresponding text (illustrated as 904). The server 120 then performs NLU on the text (illustrated as 906), and therefrom determines a command based on the text (illustrated as 908) or other data, such as the location of device 110. The command, for example, may include data directing the device 110 to cease output of content originally output to the user 10. Alternatively or in addition, the command may include data directing the device 110 to output a notification to the user 10. The command may additionally include notification content. The server 120 also determines a form/method of output by which a notification should be communicated to the user 10 (illustrated as 112). The server 120 sends the command and output method data to the device 110 (illustrated as 114). The device 110 then executes the command. For example, execution of the command may cause the device 110 to output a notification using the form/method of the output method data (illustrated as 116).

In an unillustrated example, a notification resulting from execution of the command may be determined by the device 110. For example, the device 110 may always output notifications a single way. Alternatively, the device 110 may determine to output the notification in a way that does not interfere with conveyance of previously output content. For example, if the originally output content was purely visual content, the device 110 may determine to output the notification as audio data (and optionally as a physical signal (i.e., the device 110 may vibrate)). Conversely, if the originally output content was purely audio, the device 110 may determine to output the notification as visual data (and optionally as a physical signal (i.e., the device 110 may vibrate)).

Figure 10:
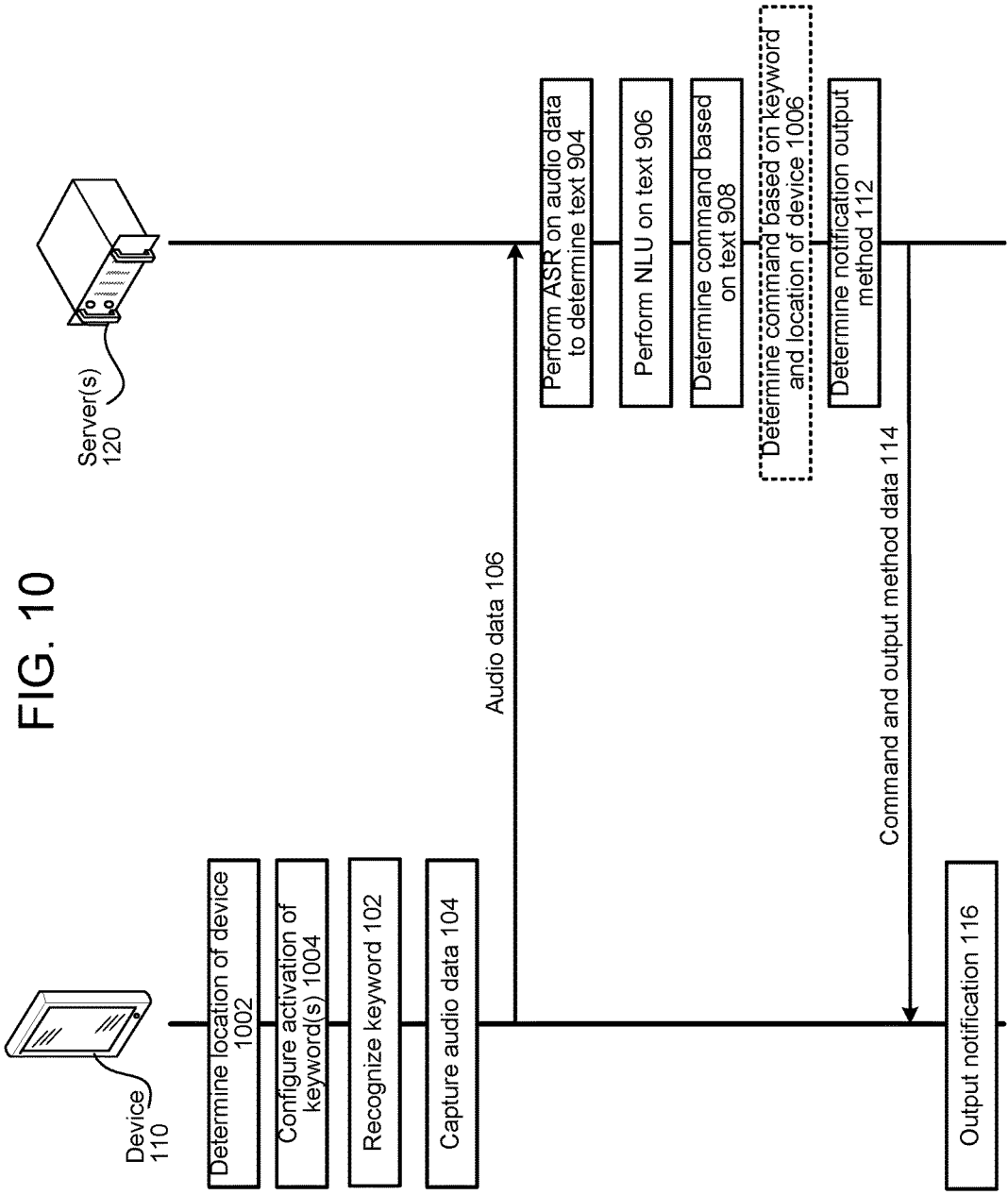
FIG. 10 data exchanges for generating and executing commands in an ASR system according to embodiments of the present disclosure.

FIG. 10 illustrates another example of data exchanges involved when performing speech processing according to embodiments of the present disclosure. While not illustrated, it should be appreciated that the device 110 may store audio data in a buffer for a threshold amount of time. The device 110 determines a location of the device 110 (illustrated as 1002). The location of the device 110 may be determined using a global positioning system ("GPS"), a location of a network to which the device 110 is connected, etc. Using the device's location, the device 110 is configured to recognize certain keyword(s) (illustrated as 1004). The device 110 may be configured to recognize one or more specific keywords at specific locations. Moreover, the device 110 may be configured to ignore one or more specific keywords at specific locations. For example, the device 110 may be configured to not recognize the user's name while the user 10 is at home, as recognizing the user's name at the user's home may provide an undesirable amount of notifications from the user's perspective. Alternatively, the user's name spoken above a certain volume threshold may trigger a command/notification. When the device 110 recognizes a keyword (which it is configured to recognize based on the device's location) in received audio (illustrated as 102), the device 110 captures audio received prior to, during, and after receipt of the keyword (illustrated as 104), and sends audio data corresponding thereto to the server 120 for processing (illustrated as 106).

The server 120 performs ASR on the audio data to determine corresponding text (illustrated as 904). The server 120 then performs NLU on the text (illustrated as 906), and therefrom determines a command based on the text (illustrated as 908). The command may include data directing the device 110 to cease output of content originally output to the user 10, for example. Alternatively or in addition, the command may include data directing the device 110 to output a notification to the user 10. The command may additionally include notification content.

In general, the same keyword may correspond to more than command. Thus, alternatively, the command may be determined based on both the location of the device 110 and the recognized keyword (illustrated as 1006). For example, the keyword/phrase "John Smith" may correspond to a first command (and/or notification) when the device 110 is located at an airport or other public venue, may correspond to a second command (and/or notification) when the device 110 is located at John Smith's home, may be recognized but not correspond to a command (and/or notification) at a certain location, etc.

The server 120 also determines a form/method of output by which the notification should be communicated to the user 10 (illustrated as 112). The server 120 sends the command and output method data to the device 110 (illustrated as 114). The device 110 then executes the command. For example, execution of the command may cause the device 110 to output a notification using the form/method of the output method data (illustrated as 116).

Figure 11:
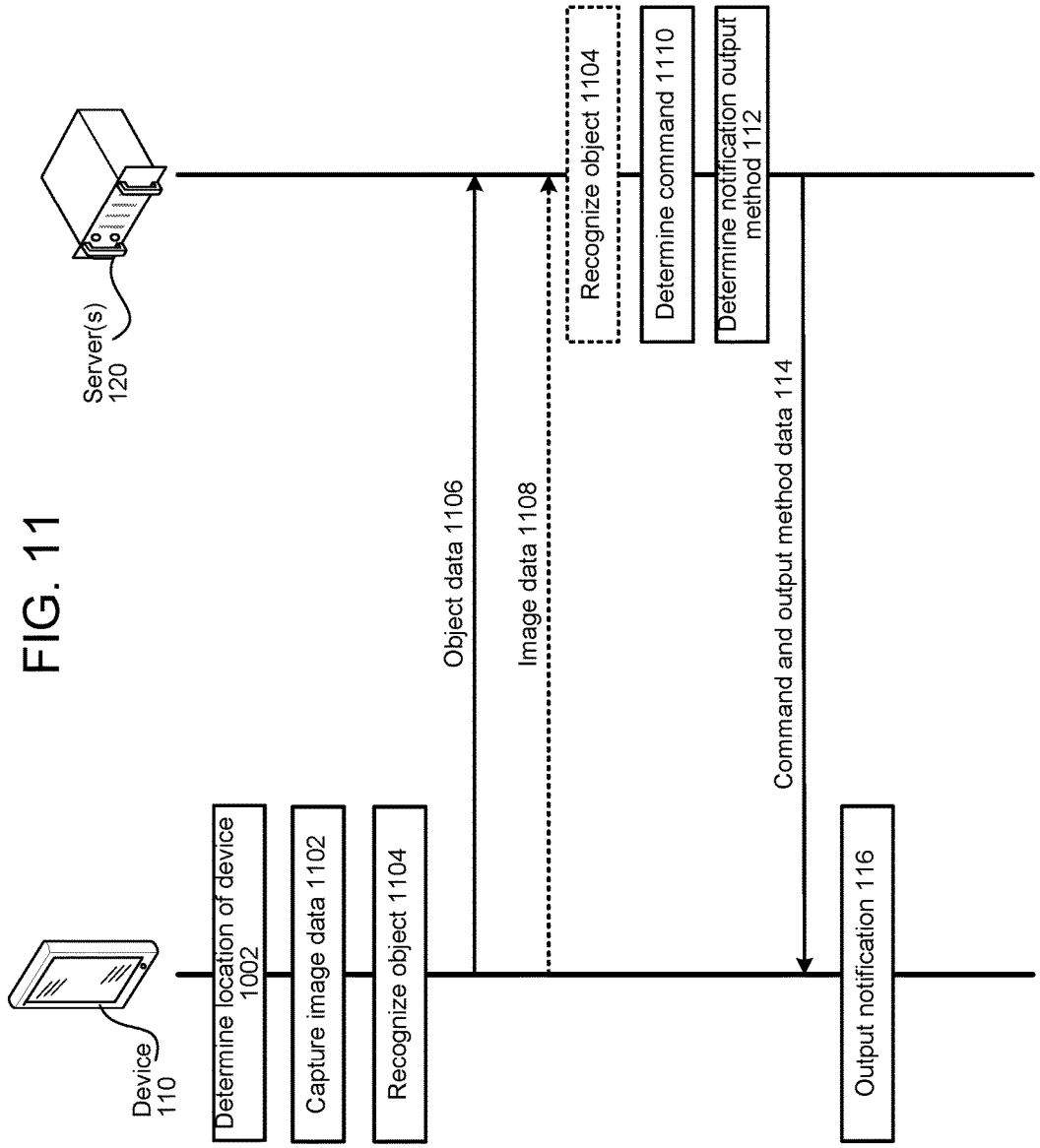
FIG. 11 illustrates data exchanges for generating and executing commands in an ASR system according to embodiments of the present disclosure.

FIG. 11 illustrates an example of data exchanges involved when creating and executing object recognition based commands according to embodiments of the present disclosure. The device 110 determines a location of the device 110 (illustrated as 1002) and captures image data via a camera of the device 110 (illustrated as 1102). The location of the device 110 may be determined using a global positioning system ("GPS"), a location of a network to which the device 110 is connected, etc. The device 110 may also be configured to recognize objects within the image data (illustrated as 1104). For example, a geographic area encompassing the determined location of the device 110 may have associated objects therewith, thereby giving the device 110 a limited number of objects to recognize within the geographic area. If the device 110 recognizes an object, data corresponding to the object is sent to the server 120 (illustrated as 1106).

Alternatively, the device 110 may not be configured to recognize objects within captured image data. When the device 110 is so configured, the device 110 may send image data to the server 120 (illustrated as 1108) and the server 120 may perform processes to recognize one or more objects within the image data (illustrated as 1104), with or without use of the determined location of the device. Recognition of objects by either the device 110 or the server 120 may involve object recognition processes known in the art.

Using the recognized object (either recognized by the device 110 or the server 120), the server 120 determines a command associated with the object (illustrated as 1110). The command may include data directing the device 110 to cease output of content originally output to the user 10, for example. Alternatively or in addition, the command may include data directing the device 110 to output a notification to the user 10. The command may additionally include notification content. For example, the server 120 may access a lookup table containing audio and/or text data associated with objects. The server 120 may also determine a form/method of output by which the notification should be communicated to the user 10 (illustrated as 112). The method of output may be determined based on or regardless to whether the device 110 is communicating content (unassociated with the captured image data) to the user 10. The method of output may also be determined based on whether a headset is connected (either via wired connection or wirelessly) to the device 110. Thereafter, the server 120 sends the command and output method data to the device 110 (illustrated as 114) and the device 110 executes the command. For example, execution of the command may cause the device 110 to output a notification using the form/method of the output method data (illustrated as 116).

If the format of the command (as stored in the lookup table) does not allow for the command to be output according to the determined output, text-to-speech ("TTS"), ASR, and/or NLU processes may be performed on the command data to convert it into a format that may be output using the determined output type. For example, if notification content is stored as text within a lookup table and it is determined the notification should be audibly output, the server 120 may perform at least TTS on the text command, thereby creating an audible command. In another example, if notification content is stored as audio within a lookup table and it is determined the notification should be visually/textually displayed, the server 120 may perform ASR and/or NLU on the audio notification content, thereby creating a textual notification. In a further example, notification content may be stored as both audio and text within a lookup table. In this example, if it is determined the notification should be audibly output, the stored audio notification content may be selected by the server 120. Alternatively, according to the same example, if it is determined the notification should be visually/textually output, the stored text notification content may be selected by the server 120. Selecting the type of stored notification content to comport with the type of determined output allows for the prevention of the need to perform TTS, ASR, and/or NLU on notification content.

Figure 12:
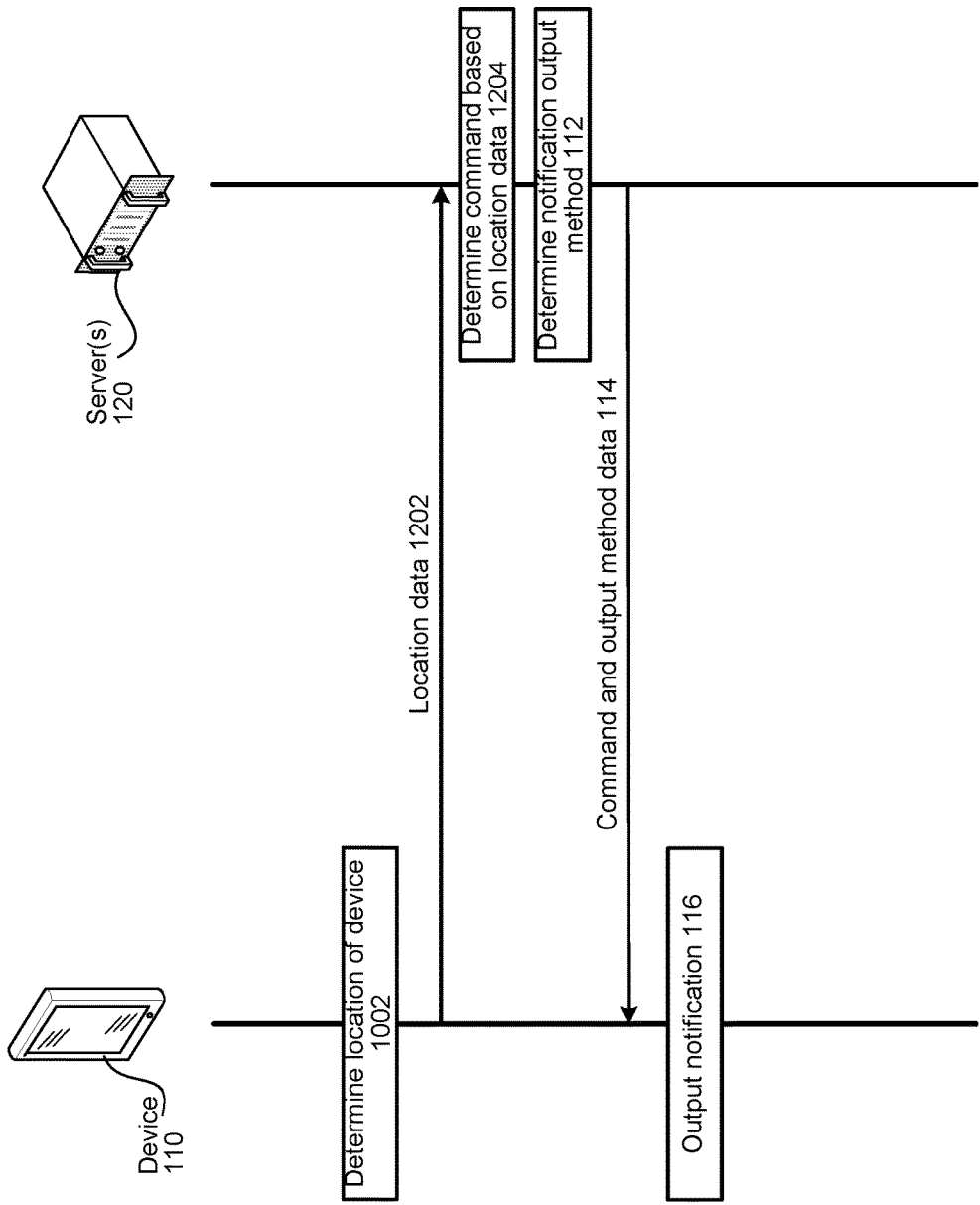
FIG. 12 illustrates data exchanges for generating and executing commands in an ASR system according to embodiments of the present disclosure.

FIG. 12 illustrates a further example of data exchanges involved when creating and executing location based commands according to embodiments of the present disclosure. The device 110 determines a location of the device 110 (illustrated as 1002) and sends the location data to the server 120 (illustrated as 1202). The location of the device 110 may be determined using a global positioning system ("GPS"), a location of a network to which the device 110 is connected, etc. The server 120 determines a command based on the location data (illustrated as 1204). The command may include data directing the device 110 to cease output of content originally output to the user 10, for example. Alternatively or in addition, the command may include data directing the device 110 to output a notification to the user 10. The command may additionally include notification content. Each determinable device location may correspond to a different command to be performed by the device 110. For example, the server 120 may access a lookup table containing audio and/or text data associated with locations. The server 120 may also determine a form/method of output by which the notification should be communicated to the user 10 (illustrated as 112). The method of output may be determined based on or regardless to whether the device 110 is communicating content to the user 10. The method of output may also be determined based on whether a headset is connected (either via wired connection or wirelessly) to the device 110. Moreover, the method of output may be determined with respect to or regardless of the determined location of the device 110. Thereafter, the server 120 sends the command and output method data to the device 110 (illustrated as 114), and the device 110 executes the command. For example, execution of the command may cause the device 110 to output a notification using the form/method of the output method data. As discussed above with respect to FIG. 11, TTS, ASR, and/or NLU may be performed (either optionally or mandatorily) on stored notification content depending upon implementation.

Figure 13:
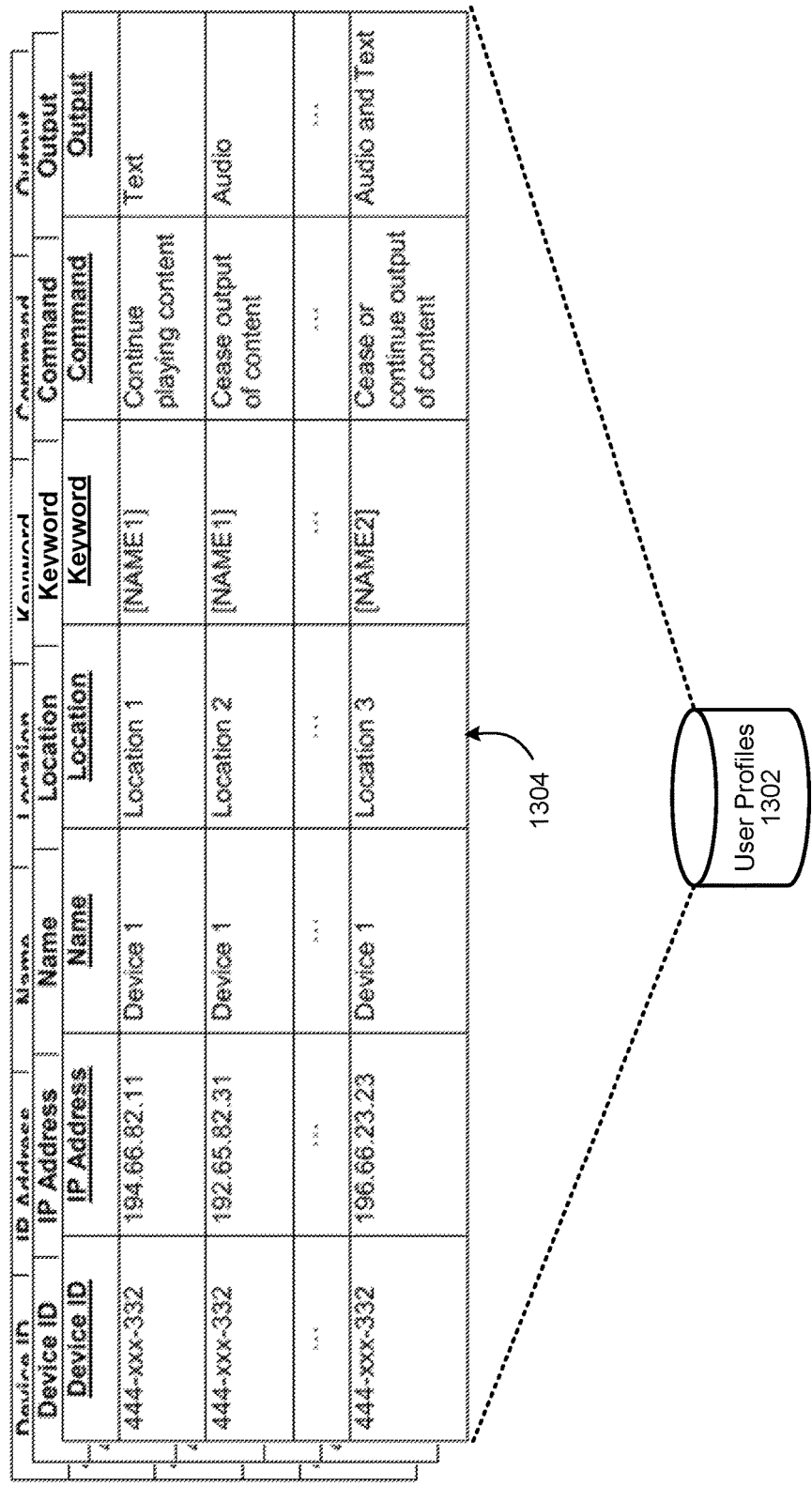
FIG. 13 illustrates data stored and associated with user profiles according to embodiments of the present disclosure.

As detailed herein above, the server 120 is configured to determine a method of output through which the device 110 should communicate the notification to a user 10. It should be appreciated that determination of the method of output may alternatively be performed by the device 110. Moreover, it should be appreciated that the determination of the method of output may involve the use of user profiles. For illustration, as shown in FIG. 13, a user profile storage 1302 (stored on either the device 110, server 120, or a remote storage accessible by the device 110 and/or server 120) may include data regarding keywords and locations associated with particular individual user accounts 1304. In an example, the user profile storage 1302 is a cloud-based storage. A single device's profile may have different keywords based on location of the device and/or the user of the device. For example, a single device may be configured to respond/wakeup in response to detecting and/or recognize different human names.

In certain configurations, multiple devices may be associated with a single user account or user profile 1304. Using the information in the user profile, for example, a first device may capture audio including a wakeword at a first location, such as a home of a user. It may be determined that a second device affiliated with the user account is at a second location (e.g., not the user's home). Depending upon the locations of the devices, a notification may be sent to one or both of the devices. Accordingly, it should be appreciated that one device may receive and capture audio while another device may receive and display/convey a notification based on the captured audio. The preferred routing of certain notifications to different devices may also be indicated in a user profile 1304. For example, audio may be detected using a smartphone 110c (illustrated in FIG. 20) while the smartphone is at a first location. The smartphone 110c may be associated with a particular user profile 1304. The profile 1304 may indicate that notifications corresponding to the detected audio (and the smartphone being at the first location) should be sent both to the smartphone 110c, but also to a smart watch 110g associated with the user's profile 1304. Thus, the system may send, for example, a visual notification to the smartphone 110c and an audio/haptic notification to the smart watch 110g.

The device 110 may send the server 120 information regarding what the device 110 is doing (i.e., what application is running) at the moment when the location and/or audio is captured. Data corresponding thereto may demonstrate the device 110 is playing music, videogames, what other application the device 110 is running, what volume the device 110 is outputting content at, etc. This data may then be used by the server 120 to determine the method of output to be used for conveying the notification to the user 10. Preferences related to the applications may also be indicated in a user profile 1304.

Figure 14:
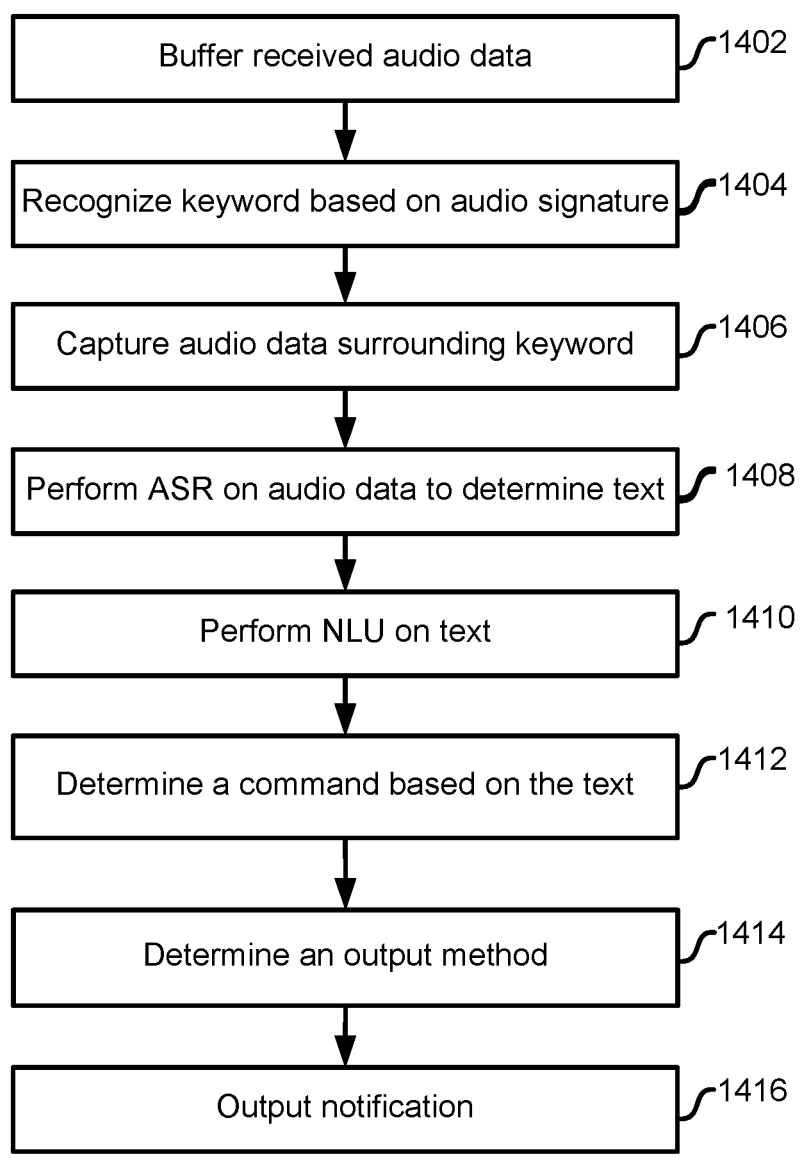
FIG. 14 is a flow chart illustrating a method for generating and executing commands according to embodiments of the present disclosure.

FIG. 14 is a flow chart illustrating a method for creating and executing commands according to embodiments of the present disclosure. As illustrated, audio data is received and buffered (illustrated as 1402). As audio data is received a keyword is recognized based on an audio signature (illustrated as 1404). Upon recognition of the keyword, audio data surrounding the keyword audio signature is captured (illustrated as 1406). ASR is performed on the captured audio data to determine text (illustrated as 1408), and NLU is performed on the text (illustrated as 1410). A command is determined based on the text (illustrated as 1412), an output method by which a notification should be communicated to a user is determined (illustrated as 1414), and the command is executed, thereby causing the notification to be output using the determined output method (illustrated as 1416).

Figure 15:
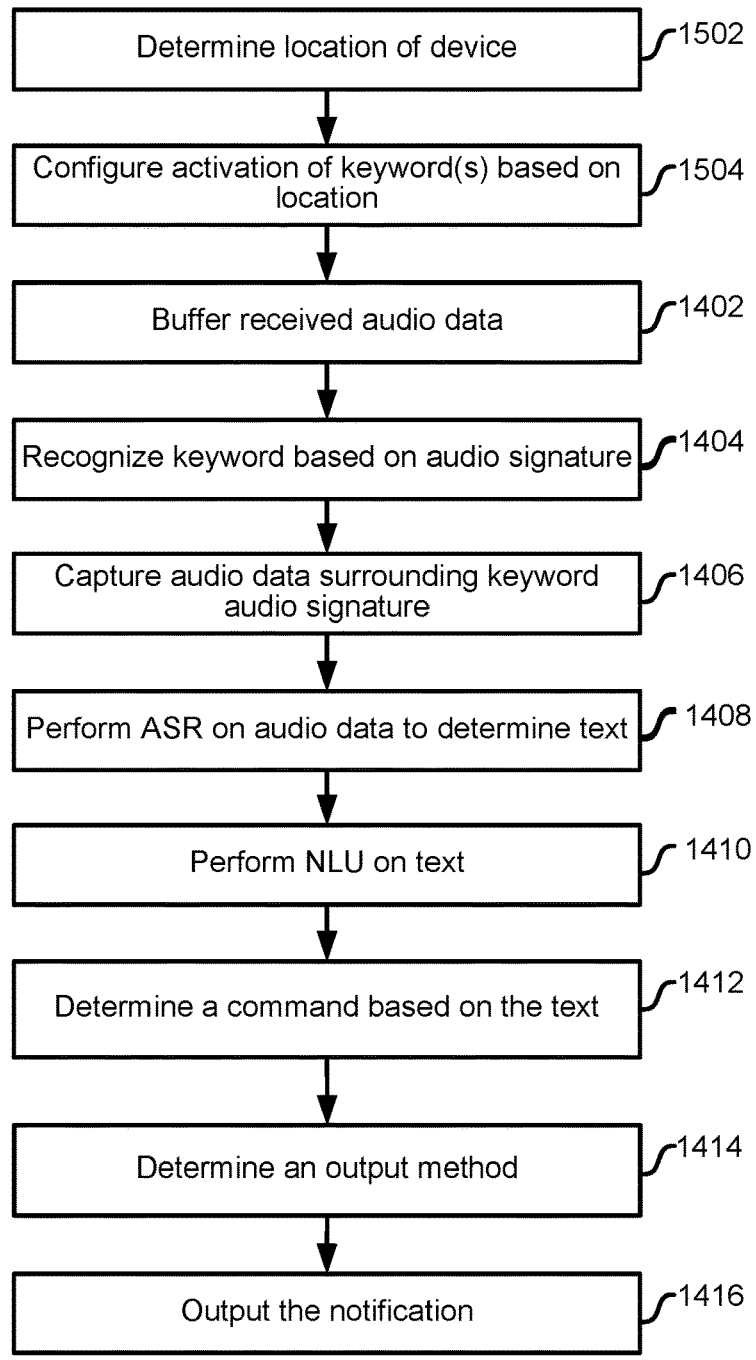
FIG. 15 is a flow chart illustrating a method for generating and executing commands according to embodiments of the present disclosure.

FIG. 15 is a flow chart illustrating a method for creating and executing commands according to embodiments of the present disclosure. As illustrated, a location of a device is determined (illustrated as 1502) and activation of recognition of one or more keywords based on the location is configured (illustrated as 1504). Simultaneously or thereafter, audio is received and buffered (illustrated as 1402). As audio is received a keyword is recognized based on an audio signature (illustrated as 1404). Upon recognition of the keyword, audio surrounding the keyword audio signature is captured (illustrated as 1406). ASR is performed on audio data corresponding to the captured audio to determine text (illustrated as 1408), and NLU is performed on the text (illustrated as 1410). A command is determined based on the text (illustrated as 1412), an output method by which a notification should be communicated to a user is determined (illustrated as 1414), and the command is executed, thereby causing the notification to be output using the determined output method (illustrated as 1416).

Figure 16:
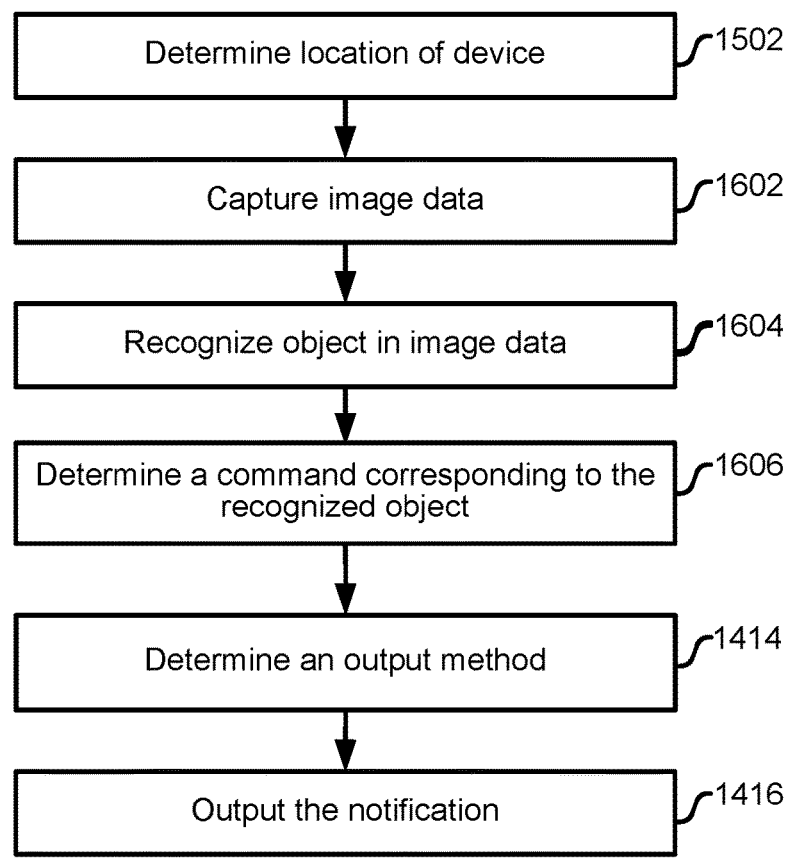
FIG. 16 is a flow chart illustrating a method for generating and executing commands according to embodiments of the present disclosure.

FIG. 16 is a flow chart illustrating a method for creating and executing object recognition based commands according to embodiments of the present disclosure. As illustrated, a location of a device is determined (illustrated as 1502) and, simultaneously or thereafter, images are captured (illustrated as 1602). As images are received/captured, one or more objects are recognized therein (illustrated as 1604). A command corresponding to each recognized object is determined, for example using a lookup table (illustrated as 1606). An output method by which a notification should be communicated to a user is also determined (illustrated as 1414), and the command is executed, thereby causing the notification to be output using the determined output method (illustrated as 1416).

Figure 17:
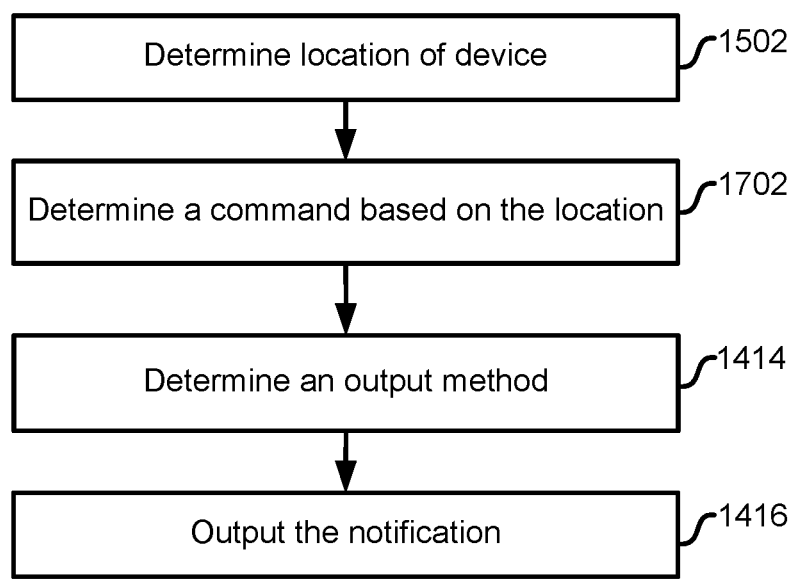
FIG. 17 is a flow chart illustrating a method for generating and executing commands according to embodiments of the present disclosure.

FIG. 17 is a flow chart illustrating a method for creating and executing location based commands according to embodiments of the present disclosure. As illustrated, a location of a device is determined (illustrated as 1502) and a command corresponding to the device's location is determined, for example using a lookup table (illustrated as 1702). An output method by which a notification should be communicated to a user is also determined (illustrated as 1414), and the command is executed, thereby causing the notification to be output using the determined output method (illustrated as 1416).

Figure 18:
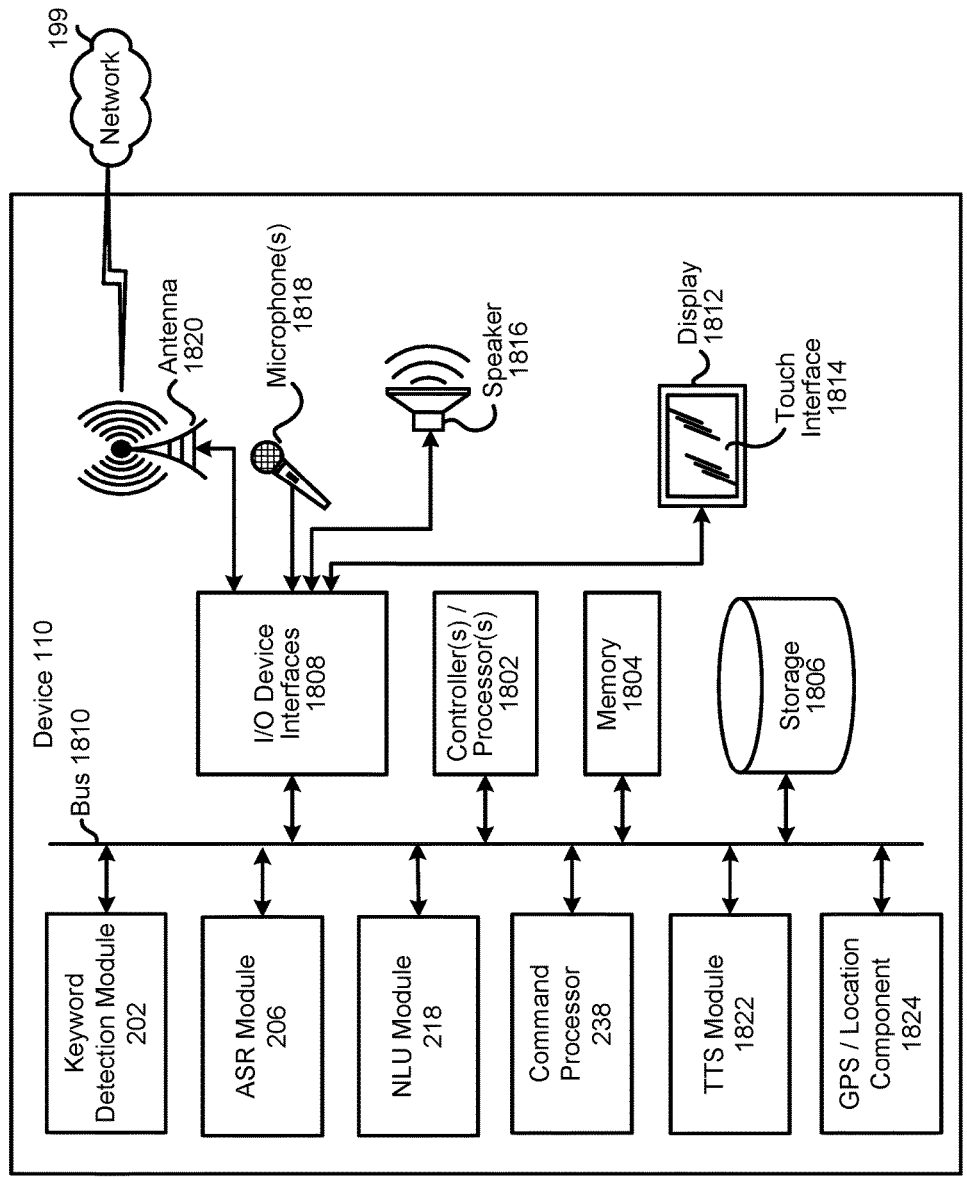
FIG. 18 is a block diagram conceptually illustrating example components of a device according to embodiments of the present disclosure.
Figure 19:
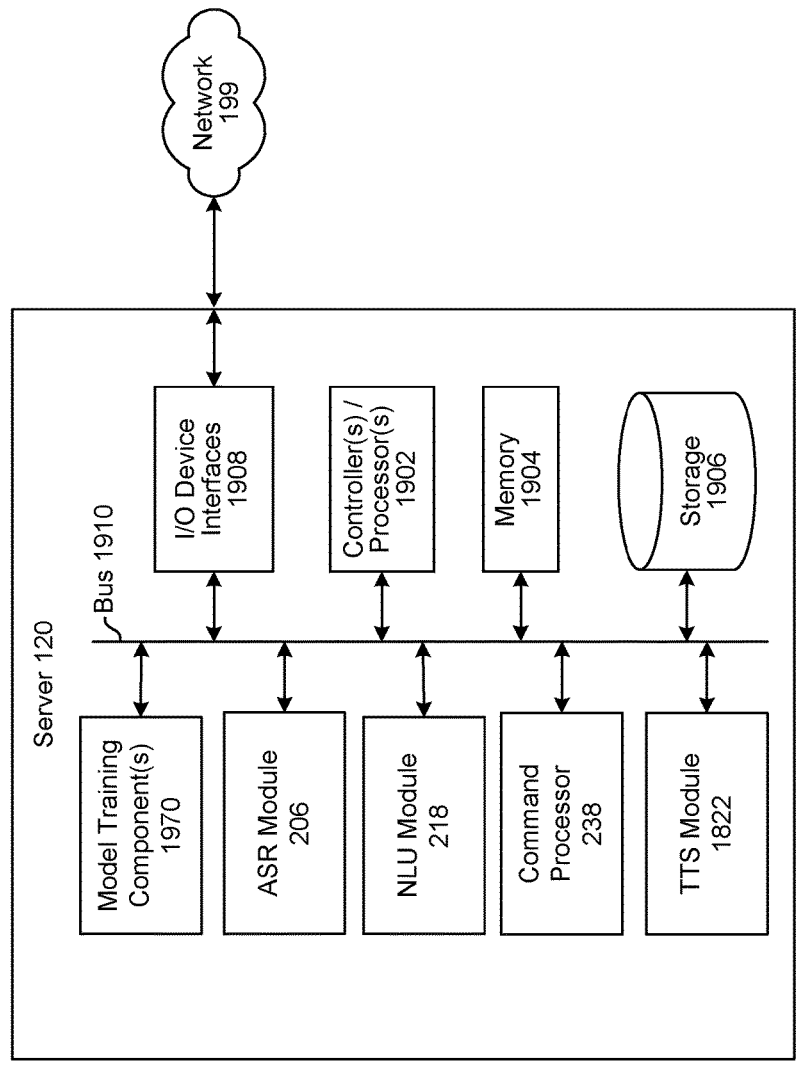
FIG. 19 is a block diagram conceptually illustrating example components of a server according to embodiments of the present disclosure.

FIG. 18 is a block diagram conceptually illustrating a local device 110 that may be used with the described system 100. FIG. 19 is a block diagram conceptually illustrating example components of a remote device, such as a remote server 120 that may assist with ASR, NLU processing, or command processing. Multiple such servers 120 may be included in the system 100, such as one server(s) 120 for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1802/1902), that may each include a central processing unit (CPU) for processing data and computer-readable instructions, and a memory (1804/1904) for storing data and instructions of the respective device. The memories (1804/1904) may individually include volatile random access memory (RAM), non-volatile read only memory (ROM), non-volatile magnetoresistive (MRAM) and/or other types of memory. Each device may also include a data storage component (1806/1906), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1808/1908).

Computer instructions for operating each device (110/120) and its various components may be executed by the respective device's controller(s)/processor(s) (1802/1902), using the memory (1804/1904) as temporary "working" storage at runtime. A device's computer instructions may be stored in a non-transitory manner in non-volatile memory (1804/1904), storage (1806/1906), or an external device(s). Alternatively, some or all of the executable instructions may be embedded in hardware or firmware on the respective device in addition to or instead of software.

Each device (110/120) includes input/output device interfaces (1808/1908). A variety of components may be connected through the input/output device interfaces, as will be discussed further below. Additionally, each device (110/120) may include an address/data bus (1810/1910) for conveying data among components of the respective device. Each component within a device (110/120) may also be directly connected to other components in addition to (or instead of) being connected to other components across the bus (1810/1910).

Referring to the device 110 of FIG. 18, the device 110 may include a display 1812, which may comprise a touch interface 1814. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1808 that connect to a variety of components such as an audio output component such as a speaker 1816, a wired headset or a wireless headset (not illustrated) or other component capable of outputting audio. The device 110 may also include an audio capture component. The audio capture component may be, for example, a microphone 1818 or array of microphones, a wired headset or a wireless headset (not illustrated), etc. The microphone 1818 may be configured to capture audio. If an array of microphones is included, approximate distance to a sound's point of origin may be performed by acoustic localization based on time and amplitude differences between sounds captured by different microphones of the array. The device 110 (using microphone 1818, keyword detection module 202, ASR module 206, etc.) may be configured to determine audio data corresponding to detected audio data. The device 110 (using input/output device interfaces 1808, antenna 1820, etc.) may also be configured to transmit the audio data to the server 120 for further processing or to process the data using internal components such as the keyword detection module 202.

For example, via the antenna(s) 1820, the input/output device interfaces 1808 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system 100 may be distributed across a networked environment.

The device 110 and/or server 120 may include an ASR module 206. The ASR module 206 in the device 110 may be of limited or extended capabilities. The ASR module 206 may include the language models 210 stored in ASR model storage component 212, and an ASR module 206 that performs the automatic speech recognition process. If limited speech recognition is included, the ASR module 206 may be configured to identify a limited number of words, such as keywords detected by the device, 110 whereas extended speech recognition may be configured to recognize a much larger range of words.

The device 110 and/or server 120 may include a limited or extended NLU module 218. The NLU module 218 in the device 110 may be of limited or extended capabilities. The NLU module 218 may comprise the name entity recognition module 220, the intent classification module 222 and/or other components. The NLU module 218 may also include a stored knowledge base and/or entity library, or those storages may be separately located.

The device 110 and/or server 120 may also include a command processor 238 that is configured to execute commands/functions associated with a spoken command as described above.

The device 110 may include a keyword detection module 202, which may be a separate component or may be included in the ASR module 206. The keyword detection module 202 receives audio signals and detects occurrences of a particular expression (such as a configured keyword) in the audio. This may include detecting a change in frequencies over a specific period of time where the change in frequencies results in a specific audio signature that the system 100 recognizes as corresponding to the keyword. Keyword detection may include analyzing individual directional audio signals, such as those processed post-beamforming, if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The keyword detection module 202 receives captured audio and processes the audio to determine whether the audio corresponds to particular keywords recognizable by the device 110 and/or system 100. The storage 1806 may store data relating to keywords and functions to enable the keyword detection module 202 to perform the algorithms and methods described above. The locally stored speech models may be pre-configured based on known information, prior to the device 110 being configured to access the network 199 by the user 10. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network 199 by the user 10. The keyword detection module 202 may access the storage 1806 and compare the captured audio to the stored models and audio sequences using audio comparison, pattern recognition, keyword spotting, audio signature, and/or other audio processing techniques.

To create output speech, the system 100 may be configured with a text-to-speech ("TTS") module 1822 that transforms input text data (for example the text from command processor 238) into audio data representing speech. The audio data may then be sent to the device 110 for playback to the user, thus creating the output speech. The TTS module 1822 may include a TTS storage for converting the input text into speech. The TTS module 1822 may include its own controller(s)/processor(s) and memory or may use the controller/processor and memory of the server(s) 120 or other device, for example. Similarly, the instructions for operating the TTS module 1822 may be located within the TTS module 1822, within the memory and/or storage of the server(s) 120, or within an external device.

Text input into a TTS module 1822 may be processed to perform text normalization, linguistic analysis, and linguistic prosody generation. During text normalization, the TTS module 1822 processes the text input and generates standard text, converting such things as numbers, abbreviations (such as Apt., St., etc.), and symbols ($, %, etc.) into the equivalent of written out words.

During linguistic analysis the TTS module 1822 analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module 1822 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module 1822 may also identify different grammatical components such as prefixes, suffixes, phrases, punctuation, syntactic boundaries, or the like. Such grammatical components may be used by the TTS module 1822 to craft a natural sounding audio waveform output. The language dictionary may also include letter-to-sound rules and other tools that may be used to pronounce previously unidentified words or letter combinations that may be encountered by the TTS module 1822. Generally, the more information included in the language dictionary, the higher quality the speech output.

Based on the linguistic analysis, the TTS module 1822 may then perform linguistic prosody generation where the phonetic units are annotated with desired prosodic characteristics, also called acoustic features, which indicate how the desired phonetic units are to be pronounced in the eventual output speech. During this stage the TTS module 1822 may consider and incorporate any prosodic annotations that accompanied the text input. Such acoustic features may include pitch, energy, duration, and the like. Application of acoustic features may be based on prosodic models available to the TTS module 1822. Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module 1822, the TTS module 1822 may assign more robust and complex prosodic characteristics that vary across the portion, thus making the portion sound more human, resulting in higher quality audio output.

The TTS module 1822 may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module 1822 may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module 1822 may perform speech synthesis using one or more different methods. In one method of synthesis called unit selection, described further below, the TTS module 1822 matches the symbolic linguistic representation against a database of recorded speech, such as a database of a voice corpus. The TTS module 1822 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module 1822 may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module 1822 to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module 1822 may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module 1822 may be configured to perform TTS processing in multiple languages. For each language, the TTS module 1822 may include specially configured data, instructions, and/or components to synthesize speech in the desired language(s). To improve performance, the TTS module 1822 may revise/update the contents of the TTS storage based on feedback of the results of TTS processing, thus enabling the TTS module 1822 to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module 1822 may include specialized databases or models to account for user preferences.

For example, to create the customized speech output of the system 100, the system 100 may be configured with multiple voice corpuses/unit databases, where each unit database is configured with a different "voice" to match desired speech qualities. The voice selected by the TTS module 1822 to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system 100 may provide.

The device 110 may also include positioning components such as a global positioning system (GPS) component 1824, which may calculate a global position of the device 110. The device 110 may also include motion sensor components (not illustrated), which may include sensors such as an accelerometer, gyroscope, or the like.

As noted above, multiple devices (e.g., the device 110 and server 120) may be employed in a single speech processing system 100. In such a multi-device system 100, each of the devices may include different components for performing different aspects of the speech processing. The multiple devices may include overlapping components. The components of the devices 110 and server 120, as illustrated in FIGS. 18 and 19, are exemplary, and may be located as a stand-alone device or may be included, in whole or in part, as a component of a larger device or system.

Figure 20:
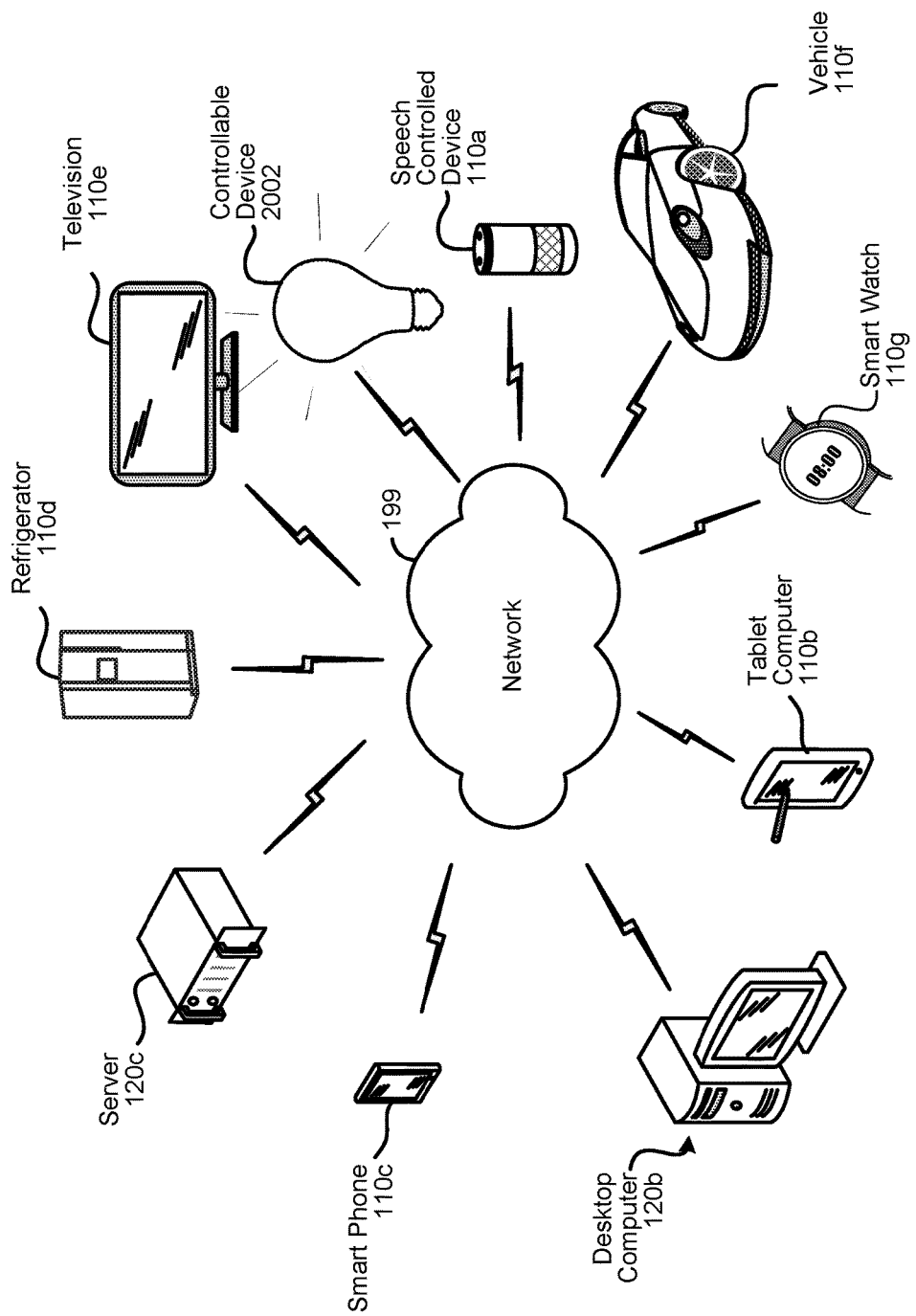
FIG. 20 illustrates an example of a computer network for use with the system according to embodiments of the present disclosure.

As illustrated in FIG. 20, multiple devices (110a to 110c and 110g) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a television 110e, a smart watch 110g, etc. may be connected to the network 199 through a wireless service provider, over a WiFi or cellular network connection or the like. Mobile local devices, such as a vehicle 110f may also be configured to capture audio as part of the system 100. The vehicle 110f may incorporate the configurable keyword functionality of local devices and may, like other local devices 110, communicate with server 120c, to receive indications of what keywords should be activated for detection during certain conditions. Other devices are included as network-connected support devices, such as desktop computer 120b, and a server 120c. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 206, NLU 218, etc. of one or more servers 120c.

Further, multiple devices 110 may be considered when operating the system. For example, if a speech controlled device 110a is operating at the same time as a tablet computer 110b, and the system 100 is capturing audio through speech controlled device 110a, but a first application is operating on tablet computer 110b, if a keyword is detected from audio captured by speech controlled device 110a, the command for the keyword may be determined based on the first application operating on tablet computer 110b.

The system 100 may also include multiple controllable devices 2002, illustrated by the lightbulb in FIG. 20. Such controllable devices may themselves not be configured for speech processing or audio capture, but may be controllable by the system in response to certain keywords. For example, a light such as 2002 may be used to indicate a keyword detected by the system but missed by the user. Many such controllable devices 2002 may be included in the present system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware, such as the acoustic front end 208, which comprises among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
 by a mobile device:
  operating an application;
  determining a location of the mobile device,
  determining the mobile device is outputting, through a headphone output, first audio corresponding to the application,
  configuring recognition of a keyword while at the location,
  receiving second audio corresponding to an environment of the mobile device,
  storing, in a buffer, first audio data corresponding to the second audio,
  determining that the keyword is represented in the first audio data, and
  sending, to a server, the audio data and an indication that the application is operating on the mobile device; and
 by the server:
  performing speech recognition on the first audio data to determine text,
  determining, using the text, the indication, and a user profile associated with the mobile device, how to output a notification using the mobile device, and
  sending a first message to the application to cause the mobile device to alter the output of the first audio and to output second audio corresponding to at least a portion of the first audio data through the headphone output.

2. The computer-implemented method of claim 1, further comprising, by the server:
 determining second text corresponding to the notification;
 performing text-to-speech processing on the second text to generate second audio data indicating that the keyword was detected; and
 sending a second message to the application to cause the mobile device to output third audio corresponding to the second audio data through the headphone output.

3. The computer-implemented method of claim 1, further comprising, by the server:
 determining that output of the second audio will interfere with output of the first audio; and
 including in the first message an instruction to output the first audio at a first volume level and to output the second audio at a second volume level, the second volume level being greater than the first volume level.

4. The computer-implemented method of claim 1, further comprising, by the mobile device, storing the first audio data, wherein the first message includes an indication to output at least a portion of the first audio data that has been stored.

5. A computer-implemented method comprising:
 determining that a device is at a first location;
 based at least in part on determining that the device is at the first location:
  determining that a keyword is associated with the first location, and
  enabling recognition of the keyword;
 determining audio data corresponding to an environment of the device;
 determining that the audio data includes the keyword; and
 based at least in part on determining that the audio data includes the keyword, causing the device to output a user-perceptible notification corresponding to the keyword.

6. The computer-implemented method of claim 5, further comprising:
 outputting, by the device, audible content; and
 causing output of the audible content to cease while the user-perceptible notification is output.

7. The computer-implemented method of claim 5, further comprising:
 outputting, by the device, audible content; and
 causing the audible content to be output at a first volume while the user-perceptible notification is output at a second volume, the second volume being greater than the first volume.

8. The computer-implemented method of claim 5, further comprising:
 performing text-to-speech processing to generate output audio indicating that the keyword was detected; and
 including the output audio in the user-perceptible notification.

9. The computer-implemented method of claim 5, further comprising:
 playing, on the device, visual content; and
 causing playback of the visual content to cease while the user-perceptible notification is output.

10. The computer-implemented method of claim 5, further comprising:
 outputting, on the device, visual content; and
 causing the visual content to be output in a background of a display while the user-perceptible notification is output in a foreground of the display.

11. The computer-implemented method of claim 5, further comprising:
 outputting, on the device, content;

determining, at a first time, that the first location is within a predefined area;

based at least in part on determining that the first location is within the predefined area, causing output of the content to cease;

determining, at a second time, that the device is at a second location;

determining that the second location is outside the predefined area; and based at least in part on determining that the second location is outside the predefined area, causing output of the content to resume.

12. The computer-implemented method of claim 5, further comprising:

determining the device is paired with an external audio output; and configuring a microphone of the device to enable recognition of the keyword.

13. A computing system comprising:

at least one processor;

a memory including instructions operable to be executed by the at least one processor to configure the system to:

receive, from a first device, an indication that at least one operation is being performed by the first device;

receive, from the first device, input audio data;

perform speech processing on the input audio data to determine text;

identify an output type using the text and the indication, the output type indicating how a user-perceptible notification is to be output by the first device; and send, to the first device, an instruction that causes the first device to interrupt performance of the at least one operation and to output the user-perceptible notification corresponding to the output type.

14. The computing system of claim 13, wherein the at least one operation comprises outputting audible content, and wherein the memory includes additional instructions executable by the at least one processor to further configure the system to:

cause the first device to cease output of the audible content while the user-perceptible notification is output.

15. The computing system of claim 13, wherein the at least one operation comprises outputting audible content, and wherein the memory includes additional instructions executable by the at least one processor to further configure the system to:

cause the first device to output the audible content at a first volume while the user-perceptible notification is output at a second volume, the second volume being greater than the first volume.

16. The computing system of claim 13, wherein the memory includes additional instructions executable by the at least one processor to further configure the system to:

perform text-to-speech processing to generate output audio data corresponding to the input audio data; and include the output audio data in the user-perceptible notification.

17. The computing system of claim 13, wherein the at least one operation comprises outputting visual content, and wherein the memory includes additional instructions executable by the at least one processor to further configure the system to:

cause the first device to cease display of the visual content while the user-perceptible notification is output.

18. The computing system of claim 13, wherein the memory includes additional instructions executable by the at least one processor to further configure the system to:

determine the output type using a user profile associated with the first device.

19. The computing system of claim 13, wherein the at least one operation comprises outputting audible content, and wherein the memory includes additional instructions executable by the at least one processor to further configure the system to:

determine that output of the user-perceptible notification will interfere with output of the audible content; and include, in the instruction, a further instruction to output the user-perceptible notification at a first volume level and to output the audible content at a second volume level.

20. The computing system of claim 13, wherein the at least one operation comprises outputting visual content, and wherein the memory includes additional instructions executable by the at least one processor to further configure the system to:

determine that output of the user-perceptible notification will interfere with output of the visual content; and include, in the instruction, a further instruction to output the user-perceptible notification in a foreground of a display of the first device and to output the visual content in a background of the display of the first device.

* * * * *